(12) United States Patent
Rastegar et al.

(10) Patent No.: US 11,955,619 B2
(45) Date of Patent: Apr. 9, 2024

(54) METAL-OXYGEN PRIMARY RESERVE BATTERIES WITH INTEGRATED OXYGEN GENERATOR FOR MUNITIONS AND THE LIKE APPLICATIONS

(71) Applicant: Omnitek Partners LLC, Ronkonkoma, NY (US)

(72) Inventors: Jahangir S Rastegar, Stony Brook, NY (US); Javier Alvare, Sandy, UT (US)

(73) Assignee: OMNITEK PARTNERS L.L.C., Ronkonkoma, NY (US)

( * ) Notice: Subject to any disclaimer, the term of this patent is extended or adjusted under 35 U.S.C. 154(b) by 0 days.

(21) Appl. No.: 17/567,840

(22) Filed: Jan. 3, 2022

(65) Prior Publication Data

US 2022/0216541 A1 Jul. 7, 2022

Related U.S. Application Data

(60) Provisional application No. 63/133,643, filed on Jan. 4, 2021.

(51) Int. Cl.
*H01M 12/06* (2006.01)

(52) U.S. Cl.
CPC ................. *H01M 12/065* (2013.01)

(58) Field of Classification Search
CPC .......................... H01M 12/065; H01M 12/06
See application file for complete search history.

(56) References Cited

U.S. PATENT DOCUMENTS

| | | | |
|---|---|---|---|
| 5,445,901 A * | 8/1995 | Korall | H01M 50/50 429/452 |
| 11,588,195 B2 * | 2/2023 | Rastegar | H01M 12/06 |
| 2009/0239132 A1 * | 9/2009 | Johnson | H01M 50/24 429/61 |
| 2010/0151336 A1 * | 6/2010 | Nakanishi | H01M 8/04119 429/407 |
| 2015/0340704 A1 * | 11/2015 | Ishikawa | H01M 12/08 429/405 |
| 2022/0052398 A1 * | 2/2022 | Rastegar | H01M 12/06 |

* cited by examiner

*Primary Examiner* — Stewart A Fraser

(57) ABSTRACT

A metal-gas battery including: a battery core including: a metal anode; a non-aqueous electrolyte; a porous cathode; and terminals for providing electrical power from the battery core. The metal-gas battery further including a gas generator configured to be activated by electrical power to generate a pressurized gas; and a gas container having an opening through which the generated gas can move from the gas container into the porous cathode to activate the battery core.

20 Claims, 13 Drawing Sheets

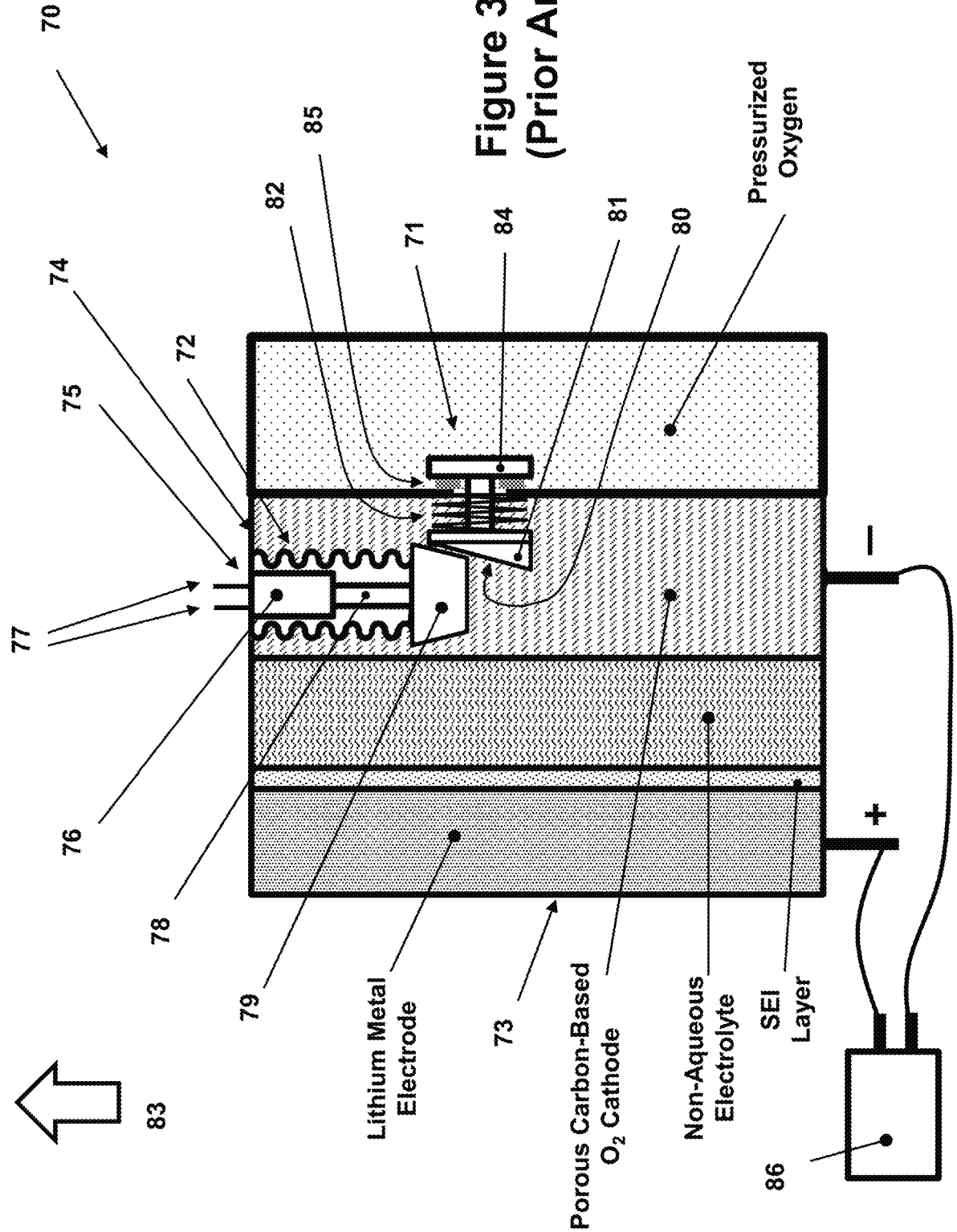

Table I. Properties of Various Oxygen Sources

| Compound | Density | Available Wt. % | Oxygen G./cc. | Required for 1 Man-Day Lb.[a] | Cc. |
|---|---|---|---|---|---|
| LiClO$_4$ | 2.43 | 60.1 | 1.45 | 3.35 | 626 |
| NaClO$_4$ | 2.53 | 52.0 | 1.31 | 3.84 | 689 |
| KClO$_4$ | 2.52 | 46.2 | 1.16 | 4.33 | 777 |
| LiClO$_3$ | 2.63 | 53.0 | 1.42 | 3.77 | 639 |
| NaClO$_3$ | 2.49 | 45.1 | 1.13 | 4.43 | 808 |
| KClO$_3$ | 2.32 | 39.2 | 0.91 | 5.10 | 998 |
| 98% H$_2$O$_2$ | 1.43 | 46.1 | 0.66 | 4.43 | 1373 |
| Liquid O$_2$ at −183° C. | 1.14 | 100.0 | 1.14 | 2.00 | 797 |
| LiO$_2$ | ... | 61.6 | ... | 3.25 | ... |
| LiO$_3$ | ... | 72.8 | ... | 2.75 | ... |

[a] 1 man-day oxygen requirement taken as 2 lb.

Figure 4

METAL-OXYGEN PRIMARY RESERVE BATTERIES WITH INTEGRATED OXYGEN GENERATOR FOR MUNITIONS AND THE LIKE APPLICATIONS

CROSS-REFERENCE TO RELATED APPLICATION

This application claims the benefit of U.S. Provisional Application No. 63/133,643, filed on Jan. 4, 2021, the entire contents of which is incorporated herein by reference.

BACKGROUND

Field

The present disclosure relates generally to reserve power sources for munitions and other similar applications; and more particularly to novel metal-oxygen reserve batteries with integrated oxygen generators and methods of their activation for use in gun-fired munitions, sub-munitions, mortars, and the like. The metal-oxygen batteries may be activated and deactivated several times as required to satisfy the system power requirement and to maximize the power source run time.

Prior Art

Reserve batteries of the electrochemical type are well known in the art for a variety of uses where storage time before use is extremely long. Reserve batteries are in use in applications such as batteries for gun-fired munitions including guided and smart, mortars, fusing mines, missiles, and many other military and commercial applications. The electrochemical reserve-type batteries can in general be divided into two different basic types.

The first type includes the so-called thermal batteries, which are to operate at high temperatures. Unlike liquid reserve batteries, in thermal batteries the electrolyte is already in the cells and therefore does not require a release and distribution mechanism such as spinning. The electrolyte is dry, solid and non-conductive, thereby leaving the battery in a non-operational and inert condition. These batteries incorporate pyrotechnic heat sources to melt the electrolyte just prior to use in order to make them electrically conductive and thereby making the battery active. The most common internal pyrotechnic is a blend of Fe and $KClO_4$. Thermal batteries utilize a molten salt to serve as the electrolyte upon activation. The electrolytes can be mixtures of alkali-halide salts and are used with the $Li(Si)/FeS_2$ or $Li(Si)/CoS_2$ couples. Some batteries also employ anodes of Li(Al) in place of the Li(Si) anodes. Insulation and internal heat sinks are used to maintain the electrolyte in its molten and conductive condition during the time of use.

The second type includes the so-called liquid reserve batteries in which the electrodes are fully assembled for cooperation, but the liquid electrolyte is held in reserve in a separate container until the batteries are desired to be activated. In these types of batteries, since there is no degradation of the electrodes under these circumstances, the shelf life of the batteries is essentially unlimited. The battery is activated by transferring the electrolyte from its container to the battery electrode compartment (hereinafter referred to as the "battery cell").

A typical liquid reserve battery is kept inert during storage by keeping the organic electrolyte separated in a glass or metal ampoule or in a separate compartment inside the battery case. The electrolyte compartment may also be separated from the electrode compartment by a membrane or the like. Prior to use, the battery is activated by breaking the ampoule or puncturing the membrane allowing the electrolyte to flood the electrodes. The breaking of the ampoule or the puncturing of the membrane is achieved either mechanically using certain mechanisms or by the high-G firing setback shock. In these batteries, the projectile spin or a wicking action of the separator is generally used to transport the electrolyte into the battery cells.

In recent years, there have been several advancements in reserve battery technologies. Among these advances are superhydrophobic nanostructured materials, bimodal lithium reserve batteries, and ceramic fiber separator for thermal batteries. In one liquid reserve battery technology under development, "superhydrophobic nanostructured material" is used in a honeycomb structure to keep the electrolyte separated from the battery cell. "Electrowetting" is achieved by the application of a trigger voltage pulse. The electrolyte can then penetrate the honeycomb structure and meet the electrodes, thereby making the cell electrochemically active.

The currently available liquid reserve and thermal batteries of all types and configurations and those that are known to be under development suffer from several basic shortcomings for many current and future munitions applications, including the following:

1. The main shortcoming of currently available liquid reserve batteries of all types and configurations is their very poor performance at low temperatures, such as below −25 deg. F. and for becoming almost non-functional at lower temperatures. In most munition applications, however, the batteries are required to be operational at significantly lower temperatures of −40 deg. F. and sometimes lower, and sometimes after storage at temperatures as low as −65 deg. F.
2. Another shortcoming of all currently available liquid reserve batteries is activation at very low temperatures.
3. Another shortcoming of all currently available liquid reserve batteries is their relatively slow rise time, such as at low temperatures. Researchers have, however, attempted to minimize this shortcoming by, for example, by injecting pressurized electrolyte into the battery cells; using wicks to increase the electrolyte diffusion rate; utilize spin and/or setback to move electrolyte into the battery cell to increase; etc. These methods have improved the liquid reserve battery rise time to but not significantly enough to address all applications and in many applications such solutions are not even practical.
4. Thermal reserve batteries do not have low temperature issues and can be activated and produce power at even below −100 deg. F. However, thermal batteries have very short run time, such as for smaller sizes that are required in gun-fired munitions in which the run time might become even less than one minute.
5. Currently available liquid reserve and thermal reserve batteries have both the shortcoming of not being able to be reverted to their reserve state once they have been activated. This capability is highly desirable for many munitions and other emergency powering applications in which different amounts of electrical power may be needed at different times with periods in between, which might be very long, during which no power is needed.
6. Currently available liquid reserve batteries do not have the capability of being partially activated to generate certain amount of electrical energy and similarly be reactivated several times to generate electrical energy on demand.

In current metal-based liquid reserve batteries, such as lithium thionyl chloride and lithium graphite fluoride, rely on the supply of a liquid electrolyte to the cathode electrode at the time of activation. This requires the storage of the liquid electrolyte separately from the rest of the battery mostly inside glass ampoules, which are broken in the process of activation. The liquid electrolytes have also been stored in metal bellows with provided membranes or have been separated from the battery core by certain membranes, which in either case is ruptured during the activation process. In general, the activation process is relatively slow, resulting in relatively slow power rise time, and face distribution issues inside the battery core, such as at low temperatures.

There are only a few battery chemistries that have the potential chance of achieving significantly higher energy density than is currently available for reserve batteries. The main candidates for achieving significantly higher energy density for reserve batteries are metal-air based battery systems, FIG. 1. The most common type of commercial metal-air battery utilizes zinc-air chemistry and has a practical specific energy of ~370 Wh/kg, while this battery chemistry has a theoretical specific energy of 1350 Wh/kg. In addition to zinc-air batteries, aluminum-air batteries are also available in the commercial market, although only in a limited fashion. Aluminum-air batteries have a much greater theoretical specific energy (8140 Wh/kg) and although they currently have a practical specific energy of ~350 Wh/kg but have the potential for significant specific energy improvement. The highest theoretical specific energy for a metal-air battery chemistry is lithium-air at 11,500 Wh/kg giving it and aluminum-air batteries the best potential to realize significantly higher specific energy values for reserve batteries as compare to the currently available reserve batteries.

In the disclosed novel primary Metal-Oxygen battery, oxygen gas reacts with the metal ions on the porous carbon substrate cathode. There is a clear advantage of Metal-Oxygen batteries over traditional liquid primary reserve batteries in that the activation mechanism of the former does not require the injection of a liquid electrolyte but of oxygen gas. While Metal-Oxygen batteries do still require a liquid electrolyte to transport the metal ions from the metal anode to the cathode electrode during battery discharge, the liquid electrolyte on its own does not activate the battery and hence it can then be added to the battery during the assembly process. Since the activation of the battery relies on the transport of a gas, and not of a liquid, into the porous cathode material, the rate of activation for Metal-Oxygen batteries is much faster and more efficient than that of the traditional liquid reserve batteries. If the metal used in the battery is lithium, and since the theoretical energy density of Li-Oxygen batteries is the highest of all lithium metal batteries (11,500 Wh/kg of lithium, excluding the oxygen mass), therefore primary reserve Li-Oxygen batteries have the potential to be significantly more energy dense than the traditional liquid reserve batteries.

A primary reserve battery based on Metal-Oxygen chemistry is activated by allowing oxygen gas to enter the porous cathode material. The metal in the battery can be one of those indicated in FIG. 1 and more, i.e., lithium, sodium, potassium, zinc, magnesium, calcium, aluminum, iron, silicon, germanium, and tin.

It is appreciated by those skilled in the art that since Lithium-Oxygen batteries have the potential of providing reserve batteries with the highest energy density, hereinafter the different embodiments are described in terms of Lithium-Oxygen reserve batteries without any intention of limiting the disclosed embodiments to Lithium metal and in general, any of the above metals may be used to replace the Lithium metal instead, FIG. 2.

A lithium-air battery has four main components: an anode, a separator, the liquid electrolyte, and a cathode, FIG. 2. The anode is the source of lithium-ions and is typically lithium metal. The electrolytes can be aqueous, aprotic (organic), mixed aqueous/aprotic, or solid state. Each of these types of electrolyte systems is being researched today and each has its own set of advantages and disadvantages. The final component of a lithium-air battery is the cathode, which as is stated in the name of this technology, is air—or more accurately stated, the oxygen in the air. Being that the cathode materials is supplied by the oxygen in the air the mass of the cathode is very small, thus imparting a significant savings in the mass of the overall system and the theoretical specific energy. However, the oxygen still needs a platform for the electrochemical reactions of the battery to take place. These reactions are supported by the use of porous carbon materials that are in some cases coated with a catalytic metal oxide, such as $MnO_2$ or $CoO_2$.

Lithium-air batteries are primary batteries. In general, the lithium air battery includes a lithium metal anode electrode capable of generating lithium ions during discharge and a cathode containing oxygen in the air as a cathode active material, and a lithium-ion conductive medium (electrolyte) is provided between the cathode and anode. The lithium air battery has a theoretical energy density of 10,000 Wh/kg based on the weight of lithium metal or more, which corresponds to about 10 times energy density of the lithium ion battery. In addition, the lithium air battery may be eco-friendly and provide improved stability as compared to the lithium ion battery.

Currently available metal-air batteries, including Lithium-air batteries, due to their air intake from the environment, a portion of which is the useful oxygen, and due to the presence of contaminants, such as moisture, and nitrogen, which significantly degrades the performance of the battery, are also not suitable for applications such as in munitions and emergency equipment in which the battery must have a shelf life of over 20 years. To address this shortcoming, embodiments of a novel Metal-Oxygen reserve battery were disclosed (see U.S. patent application Ser. No. 17/397,877), the content of which is herein incorporated by reference in its entirety. In the disclosed embodiments of this patent application the source of battery oxygen is not air from the environment, but it is relatively pure oxygen that is stored in a pressurized vessel that can be integral to the battery.

In certain applications, however, the presence of a pressurized oxygen vessel may not be desirable, for example, due to accidental rupturing of the vessel due to impact or due to the volume of the space that it occupies in the battery. For these reasons, it is highly desirable to develop novel methods and devices to provide the required oxygen gas to the battery cell without requiring it to be stored under pressure in a separate vessel.

Therefore, reserve batteries developed based on Lithium-air battery operation mechanism would provide significantly higher energy density than is available from all current liquid reserve batteries. Such reserve batteries must, however, be suitable for use in gun-fired and other munitions, for example, should be capable of withstanding high firing shock loadings and have shelf life of over 20 years.

Currently available liquid reserve batteries do not have the capability of being partially activated to generate certain amount of electrical energy and similarly be reactivated several times to generate electrical energy on demand.

It is also highly desirable that such higher density reserve batteries be capable of being partially activated to generate certain amount of electrical energy and similarly be reactivated several times to generate electrical energy on demand. As a result, the run time of the battery can be significantly increased, such as when the battery power may be needed at different periods of time with considerable amount of time between these time periods during which very small amounts or no power may be needed.

The typical construction of a Li-Oxygen reserve battery in which the oxygen gas is provided in a pressurized compartment of the battery is described in U.S. patent application Ser. No. 17/397,877, using the basic Li-Oxygen reserve battery embodiment 10 shown in the cross-sectional schematic of FIG. 3. As can be seen in FIG. 3, the reserve battery embodiment 10 comprises a lithium metal electrode that is separated from the battery non-aqueous electrolyte by a Solid Electrolyte Interphase (SEI) layer. A porous carbon-based $O_2$ cathode is the next component of the battery core into which oxygen gas can be allowed to enter to activate the reserve battery. The above components of the Li-Oxygen reserve battery are packaged inside the sealed housing 11. To achieve a hermetically sealed reserve battery with a shelf life of over 20 years, the battery terminals 12 can be provided with glass or other similar electrical insulation as they pass through the sealed housing 11.

In another sealed compartment 18, oxygen gas is provided under pressure as shown in FIG. 3. The sealed compartment 18 and the battery core housing 11 can share a common wall 19. The common wall 19 is provided with a relatively small opening 14 into the battery core, which is normally sealed by a metallic diaphragm 13. In general, the housings 11 and 18 are made with stainless steel and the diaphragm 13 is also a thin stainless sheet that is welded to the wall 19.

Also provided inside the oxygen gas container 18 is a mass member 15, which is normally held firmly against the surface 21 of the container 18 by the preloaded compressive spring 16. The mass member 15 is provided with a sharp cutting member 17, which is positioned above the hole 14.

The Li-Oxygen reserve battery embodiment 10 operates as follows. In normal conditions, the diaphragm 13 prevents oxygen gas from entering the porous carbon-based $O_2$ cathode of the battery core. If the device to which the reserve battery 10 is attached is accelerated in the direction of the arrow 22, the acceleration would act on the mass member 15, generating a downward dynamic force. The compressive spring 16 is preloaded such that when the acceleration in the direction of the arrow 22 has reached a prescribed threshold, then the generated dynamic force would overcome the spring preload and the mass member 15 would begin to move downward towards the diaphragm 13. If the said acceleration in the direction of the arrow 22 is long enough in duration, the mass member 15 would gain enough speed for the cutting member 17 to reach the diaphragm 13 and rupture it, thereby allowing the oxygen gas to begin to flow into the porous carbon-based $O_2$ cathode section of the battery core and activate the reserve battery. If the duration of the applied acceleration in the direction of the arrow 22 is very short, for example due to accidental drop of the object to which the reserve battery 10 is attached, the mass member 15 and spring 16 system is configured such that the cutting member 17 is not displaced down enough to rupture that diaphragm 13.

In the schematic of FIG. 3 only one inertia-based activation mechanism is shown to be provided. However, when larger amount of gas flow is desired, more than one activation mechanism of this or other types may also be provided.

It is appreciated by those skilled in the art that gases present in air, such as nitrogen, water vapor, and carbon dioxide can react with the metal anode, liquid electrolyte, and cathode electrode and negatively impact the discharge performance of currently available Lithium-Air batteries. In addition, it has been extensively reported (for example, J. Read, K. Mutolo, M. Ervin, W. Behl, J. Wolfenstine, A. Driedger and D. Foster, "Oxygen Transport Properties of Organic Electrolytes and Performance of Lithium/Oxygen Battery," *Journal of Electrochemical Society*, vol. 150, no. 10, pp. A1351-A1356, 2003) that a higher oxygen partial pressure improves battery capacity, especially at high discharge rates, by increasing the oxygen saturation concentration in the liquid electrolyte and by enhancing the oxygen diffusion rates in the porous cathode active sites. Therefore, it is advantageous to feed pure oxygen to the battery from an internal pressurized oxygen storage compartment to activate and discharge the battery as is the case in the reserve battery embodiment 10 of FIG. 3.

The reserve battery embodiment 10 of FIG. 3 is assembled in the inactive state with the pressurized oxygen in the adjacent compartment 18. As a result, as long as oxygen gas is not allowed to enter the battery core through the provided hole 14 by the diaphragm 13, the battery stays in its inactive state, thus serving as a reserve battery. Once the diaphragm 13 has been ruptured as was previously described, the presence of oxygen immediately starts the reduction/oxidation reactions inside the battery core and, as a result, a voltage differential is established across the anode and cathode sides of the cell. In the porous carbon cathode electrode, oxygen is reduced to lithium peroxide that accumulates in the pores of the electrode. At the same time, lithium metal from the anode electrode is oxidized to lithium ions, which transport to the cathode electrode through the liquid electrolyte and polymeric separator to the porous carbon cathode electrode. The battery discharge reactions will continue until all the stored oxygen or the available Li metal is consumed.

FIG. 3A illustrates the cross-sectional view of another prior art Lithium-oxygen reserve battery embodiment with pressurized oxygen compartment that may be initially activated inertially when subjected to a prescribed acceleration profile or by external power with activation/deactivation on command capability.

In the prior art Lithium-Oxygen reserve battery embodiment 70 of FIG. 3A, the battery activation mechanism comprises the normally closed valve 71 and the linear solenoid (or piezoelectric-based actuation) mechanism. All other components of the Lithium-oxygen reserve battery embodiment 70 are similar to that of the embodiment 10 of FIG. 3.

The actuation mechanism of the Lithium-Oxygen reserve battery embodiment 70 of FIG. 3A comprises a metallic bellow 72, such as being formed form the same metal with which the battery core housing 73 is constructed, such as stainless steel. The bellow 72 is fixedly attached to the side surface 74 of the battery core housing 73, such as by welding of brazing, and the attachment is tested to ensure that is fully sealed. The bellow 72 is provided with a sealed cap 75, which may be integral to the bellow 72. A linear solenoid actuator 76 (or a piezoelectric or the like electrically actuated device) is positioned inside the bellow and fixed to the cap 75 as can be seen in FIG. 3A. In FIG. 3A, the terminals 77 indicate the powering terminals of the solenoid 76, which are passed through the electrical insulations (not shown) provided in the cap 75. The actuating core 78 of the solenoid 76 is then attached to a conical section shaped mass member 79. The mass member 79 is fixedly attached and sealed to the bellow 72. The conical section of the mass member 79 is positioned close or in contact with the sloped surface 80 of the member 81 of the normally closed valve 71 as can be seen in FIG. 3A. The solenoid 76 is provided with a proper return spring so that while it is not energized, the mass member 79 is at the position shown in FIG. 3A and does not force the valve 71 to open. The cap 75 may be provided with a small hole to prevent the air (gas) trapped inside the below 72 from resisting its extension.

The Li-Oxygen reserve battery with pressurized oxygen compartment embodiment 70 of FIG. 3A operates as follows. In normal conditions, the valve 71 is in its closed state and prevents oxygen gas from entering the porous carbon-based $O_2$ cathode of the battery core. In this state, the biasing forces of the compressively preloaded spring 82 and the pressure of the oxygen gas ensures that the valve 71 stays closed. The Li-Oxygen reserve battery 70 is therefore in its inactive state and provides a long shelf life that can significantly exceed the military required 20 years. If the device to which the reserve battery 70 is attached is accelerated in the direction of the arrow 83, the acceleration would act on the inertia of the mass member 79 and the solenoid core 78, generating a downward dynamic force as seen in the view of FIG. 3A. The biasing spring in the solenoid 76 (not shown) is preloaded such that when the acceleration in the direction of the arrow 83 has reached a prescribed threshold, then the generated dynamic force would overcome the spring preload and the assembly of the mass member 79 and the solenoid core 78 would begin to move down as viewed in FIG. 3A. If the magnitude of the acceleration in the direction of the arrow 83 and its duration are at or above the prescribed levels for battery activation, then the bellow 72 begins to deform, allowing the mass member 79 to move down, thereby engaging the sloped surface 80 of the member 79 and forcing it to begin to move to the right as seen in the view of FIG. 3. As a result, the cap 84 is lifted from over the elastomeric gasket 85, thereby allowing the oxygen gas to begin to flow into the porous carbon-based $O_2$ cathode section of the battery core and activate the reserve battery. Then once the acceleration in the direction of the arrow 83 has ceased, the mass member 79 is forced to return to its pre-acceleration position shown in FIG. 3A by the preloaded biasing spring of the solenoid 76, the extended bellow 72, preloaded compressive spring 82 and the oxygen gas pressure, thereby closing the valve 71 and stopping the flow of oxygen gas into the battery core.

If the applied acceleration in the direction of the arrow 83 is below the prescribed threshold, for example due to accidental drop of the object to which the reserve battery 70 is attached, the preloading level of the aforementioned biasing tensile springs are not overcome, and the mass member 79 assembly dose not engage the sloped surface 80 of the member 79 and the valve 71 stays closed.

The linear solenoid actuator 76 (or other similar linear or rotary actuators) may be of latching type. In which case, following initial inertial activation and once the battery is activated, the solenoid actuator may be activated and held in its activated position without requiring continuous power. The solenoid may also be actuated less than the distance that activates the latching mechanism, thereby providing the capability to reactivate the reserve battery several times until it is desired to stay permanently activated, at which time the solenoid is actuated to the point of activating its latching mechanism.

The reserve battery 70 is generally provided with proper electronic and drive components and can have a capacitor (all shown schematically as the member 86 in FIG. 3A), for sensing the reserve battery 70 power level and keep the battery operational as needed by supplying the battery core with oxygen as described above via the solenoid 76 actuation. It is appreciated that all components of the member 86 may be integrated inside the reserve battery housing. Such self-contained Li-Oxygen reserve batteries would greatly simplify their integration into various devices such as gun-fired munitions.

In the Li-Oxygen reserve battery embodiment 70, the inertial activation in response to the prescribed acceleration profile is configured to allow enough oxygen gas into the battery core to power the device electronics and power control system and to operate the solenoid 76 to open and close the valve 71 when needed to supply the required electrical energy. The reserve battery embodiment 70 may also be provided with a capacitor or super-capacitor (not shown) to form a "Lithium-Oxygen hybrid reserve battery", in which part of the electrical energy generated by the battery may be stored and used to provide high power pulse to certain loads or used to power low power electronics for a considerable lengths of time, such as for hours or days.

In the prior art Lithium-Oxygen reserve battery embodiment 70 of FIG. 3A, the inertial activation in response to a prescribed acceleration profile is configured to allow enough oxygen gas into the battery core to power the device electronics and power control system and to operate the on/off activation actuation device, in this case the solenoid 76. Alternatively, the Lithium-Oxygen reserve battery embodiment 70 may be paired with a capacitor (or super-capacitor) provided in the member 86, which is charged by the electrical energy generated by the initial activation of the reserve battery. The electrical energy stored in the said capacitor can then be used by the object to which the reserve battery is attached (e.g., a gun fired munition), and to re-activate the reserve battery as needed by the actuator 76. Such a combined Lithium-Oxygen reserve battery and capacitor (super-capacitor) reserve power source forms the aforementioned "Lithium-Oxygen hybrid reserve battery".

It is appreciated that such "Lithium-Oxygen hybrid reserve batteries" can be advantageous for use in applications in which they are required to provide low power for long periods of times and only occasionally they have to provide high power, such as for relatively short periods of time. In such applications, the reserve battery only needs to be activated for very short periods of times to charge the capacitor and have the capacitor supply the low power, such as, to low power electronics for hours and sometimes for days until either high power is required to be provided or when the capacitor power is low and it needs to be recharged, at which time the capacitor supplies power to the activation actuator, in this case the solenoid 76.

The "Lithium-Oxygen hybrid reserve batteries" may be provided with an electronic control circuit and microprocessor with enough memory (shown schematically in the member 86) to detect the voltage level of the hybrid reserve battery, and an electrical energy storage capacitor or super-capacitor (e.g., in the member 86), FIG. 3A. The reserve battery may then be activated, for example inertially as was described above, to allow enough oxygen gas to flow into the battery core to charge the provided capacitor or super-capacitor to a prescribed level. The electronic control circuit and microprocessor can then be powered and memory and be programmed to provide a prescribed power level based on some sensory input and/or planned profile.

It is also appreciated by those skilled in the art that the Lithium-Oxygen reserve battery embodiment 70 may also be activated directly by energizing the solenoid 76 by a provided power source in non-shock loading activation applications.

SUMMARY

A need therefore exists for reserve batteries that can provide electrical energy to munitions for relatively long run time that is currently possible with thermal batteries and liquid reserve batteries.

A need also exists for reserve batteries that can be partially activated to generate certain amount of electrical energy and similarly be reactivated several times on demand to generate electrical. This capability would significantly increase the battery run time for continuous use, such as when the required battery power may be extremely low or zero for a relatively long periods of times. This capability would also allow the battery to provide power to devices that may need to be powered at different time periods following relatively long elapsed times in between.

Accordingly, there is a need for reserve batteries that are to be used in munitions and many emergency equipment to have shelf life of over 20 years. It is appreciated by those skilled in the art that to achieve such long shelf life, the battery components must be hermetically sealed inside the reserve battery housing.

A need also exists for reserve batteries that can provide power to low power electronics over long periods of times that could extend for days, weeks and even months.

A need also exists for reserve batteries with significantly higher energy density that the currently available reserve batteries.

A need also exists for reserve batteries that can be activated very rapidly to provide electrical energy.

Such reserve batteries can be initiated as a result of the munitions firing using inertial igniters such as those disclosed in U.S. Pat. Nos. 7,437,995; 7,587,979; 7,587,980; 7,832,335 and 8,061,271 and U.S. patent application Ser. Nos. 12/774,324; 12/794,763; 12/835,709; 13/180,469; 13/207,280 and 61/551,405 (the full disclosure of each of which being incorporated herein by reference) or piezoelectric-based inertial igniters such as those disclosed in U.S. Pat. No. 8,024,469 and U.S. patent application Ser. Nos. 13/186,456 and 13/207,355 the full disclosure of each of which being incorporated herein by reference) or other electrical initiators. The piezoelectric-based inertial igniters, such as those that can provide relatively long initiation delay, are highly advantageous since by delaying the initiation, the time period in which the battery is subjected to high acceleration/deceleration levels is reduced or can even be eliminated. The reserve battery may also be activated following launch when its power is needed, which may in certain cases be long after launch and even landing. The initiation devices to be used must also be capable to operate safely by differentiating all-fire and various no-fire events such as accidental drops and vibration and impact during transportation and loading and even nearby explosions. The task of differentiating all-fire conditions from no-fire conditions can be performed without the use of external acceleration sensors and the like, and/or the use of external power sources.

An objective is to provide new types of reserve batteries (power sources) that can operate efficiently at low temperatures and that can be activated and brought to operational power levels rapidly. Such reserve batteries can also be fabricated in small sizes suitable for use in small and medium caliber munitions, sub-munitions and the like.

Another objective is to provide new types of reserve batteries and methods of their configuration and construction such that they could be activated several times to produce electrical energy for a certain amount of time and then stay deactivated for a period of time and be activated again on demand.

Another objective is to provide novel reserve batteries and methods of their configuration and construction such that they can produce electrical energy either continuously or intermittently on demand.

Another objective is to provide novel reserve batteries and methods of their configuration and construction such that they can produce electrical energy either continuously or intermittently to satisfy high power requirements that and short in duration and/or power requirements that are low power but relatively long duration, which may be hours, days or weeks or even months.

Another objective is to provide new types of reserve batteries and methods of providing smart and programmable power systems that can maximize the overall efficiency of the power system and thereby minimize the total volume of the power system, such as for munitions applications.

Another objective is to provide new types of reserve batteries and methods of their configuration and construction such that they could be rapidly activated with electrical or inertial activation devices and provide electrical energy as needed to provide the required electrical energy/power for certain periods of times and then be reactivated when it is required to generate electrical energy/power again, thereby significantly increasing the length of time that the battery can power a device or system.

In munitions applications, to ensure safety and reliability, the reserve batteries must withstand and not initiate during acceleration events which may occur during manufacture, assembly, handling, transport, accidental drops, etc. Additionally, once under the influence of an acceleration profile such as to the firing of the ordinance, i.e., an all-fire condition (with or without a programmed delay period), the reserve battery must initiate with high reliability.

The disclosed reserve power sources can be provided with hermetically sealed packaging. The disclosed reserve power sources would therefore be capable of readily satisfying most munitions requirement of 20-year shelf life requirement and operation over the military temperature range of −65 to 165 degrees F., while withstanding high G firing accelerations.

In many applications, the reserve battery is required to provide full or close to full power short time after initiation. This capability can be challenging when the reserve battery is at extremely low temperatures such as the aforementioned −65 degrees F.

There is a clear advantage for the development of reserve batteries that can use Lithium-air primary battery technologies over liquid reserve batteries and thermal batteries as was previously described. For the case of liquid reserve batteries, the main advantages include the elimination of separate liquid electrolyte storage and a significant increase in the amount of electrical energy that can become available per unit volume, which can be important in applications such as munitions. While Li-oxygen batteries do still require a liquid electrolyte to transport the lithium ions from the lithium metal anode to the cathode electrode during battery discharge, the liquid electrolyte on its own does not activate the battery and hence it can then be added to the battery during the battery assembly process.

In addition, since activation of the battery relies on the transport of a gas and not of a liquid into the porous cathode material, the rate of activation for metal-oxygen, such as Li-oxygen batteries, is much faster and efficient than that of the traditional liquid reserve batteries. Moreover, since the theoretical energy density of Li-oxygen batteries is the highest of all lithium metal batteries, Li-oxygen based reserve batteries have the potential to be capable of providing significantly more electrical energy than the currently available liquid reserve batteries.

Accordingly, methods are provided for the configuration and construction of novel reserve batteries that are based on Lithium-oxygen technology and have long shelf life of over 20 years due to their hermetically sealed components inside the battery housing.

Furthermore, methods and apparatus are provided for the configuration and construction of novel reserve batteries that can be activated intermittently, i.e., to be activated to generate certain amount of electrical energy for certain amount of time and then be activated again after a certain amount of time to resume generating electrical energy on demand.

Furthermore, methods and apparatus are provided for activation of the disclosed novel reserve batteries when subjected to a prescribed gun or the like firing accelerations as described by a shock loading level and its duration and that it does not activate under prescribed accidental shock loadings such as drop over hard surfaces or due to transportation vibration and other similar (non-activation) events.

Furthermore, methods and apparatus are provided for activation of the disclosed novel reserve batteries based on external commands, which might be initiated based on a pre-programmed plan or a sensory or certain event detection or the like.

Furthermore, methods and apparatus are provided for activation of the disclosed novel reserve batteries to achieve continuous or certain intermittent re-programmed plan to maximize the battery run time.

Furthermore, methods and apparatus are provided for integration of electrical energy storage devices such as capacitors and/or super-capacitors with the disclosed reserve batteries to provide a "hybrid" power source solution to maximize the run time of the resulting power source, such as when the reserve battery is to provide occasional high power "pulses" between long periods of low power demands.

BRIEF DESCRIPTION OF THE DRAWINGS

These and other features, aspects, and advantages of the apparatus will become better understood with regard to the following description, appended claims, and accompanying drawings where:

FIG. 3A illustrates the cross-sectional view of a prior art Lithium-oxygen reserve battery embodiment with pressurized oxygen compartment that may be initially activated inertially when subjected to a prescribed acceleration profile or by external power with activation/deactivation on command capability.

FIG. 4 illustrates a list of possible chemical sources of oxygen generation and their available oxygen per weight.

DETAILED DESCRIPTION

Figure 1:
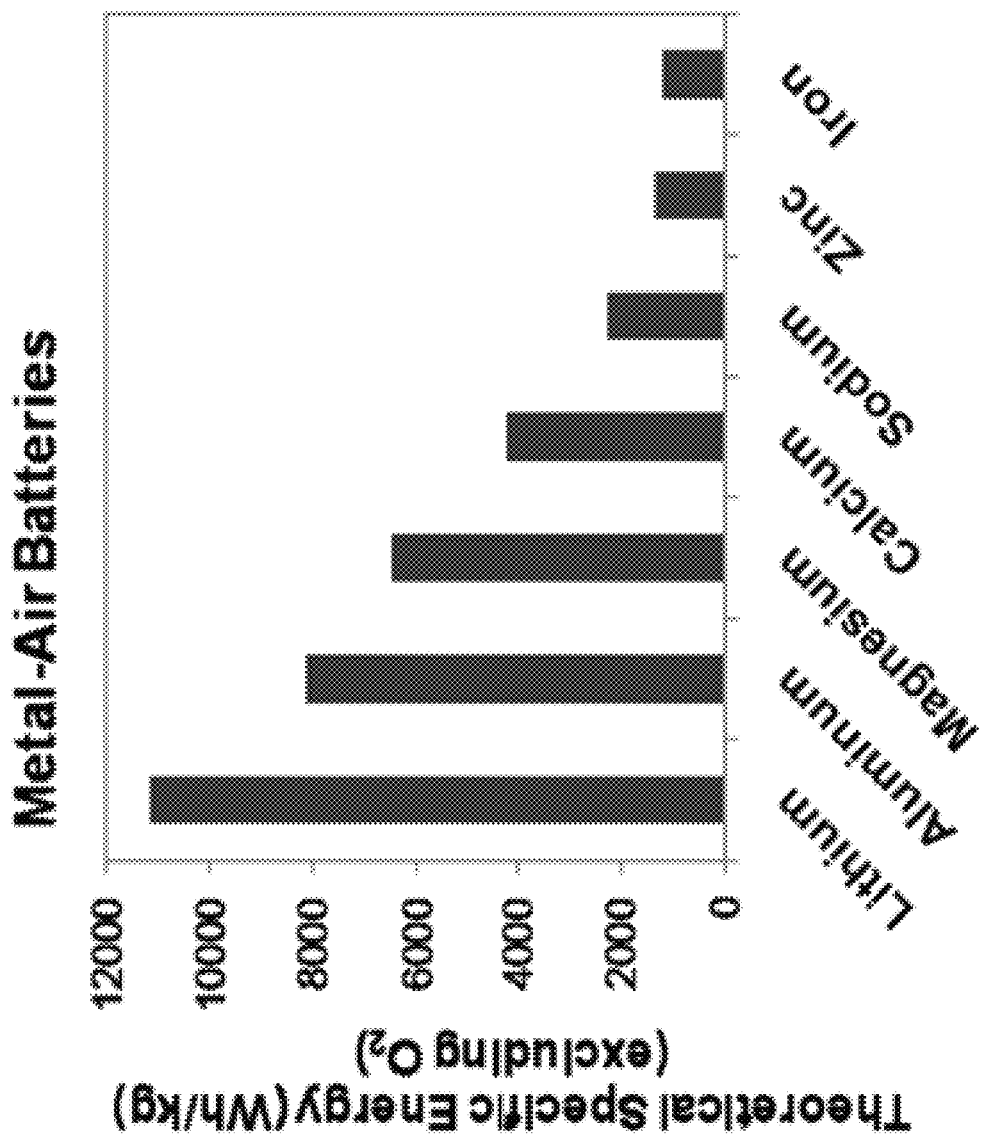
FIG. 1 presents the theoretical specific energies of various metals which can be used in metal-air battery technology.
Figure 2:
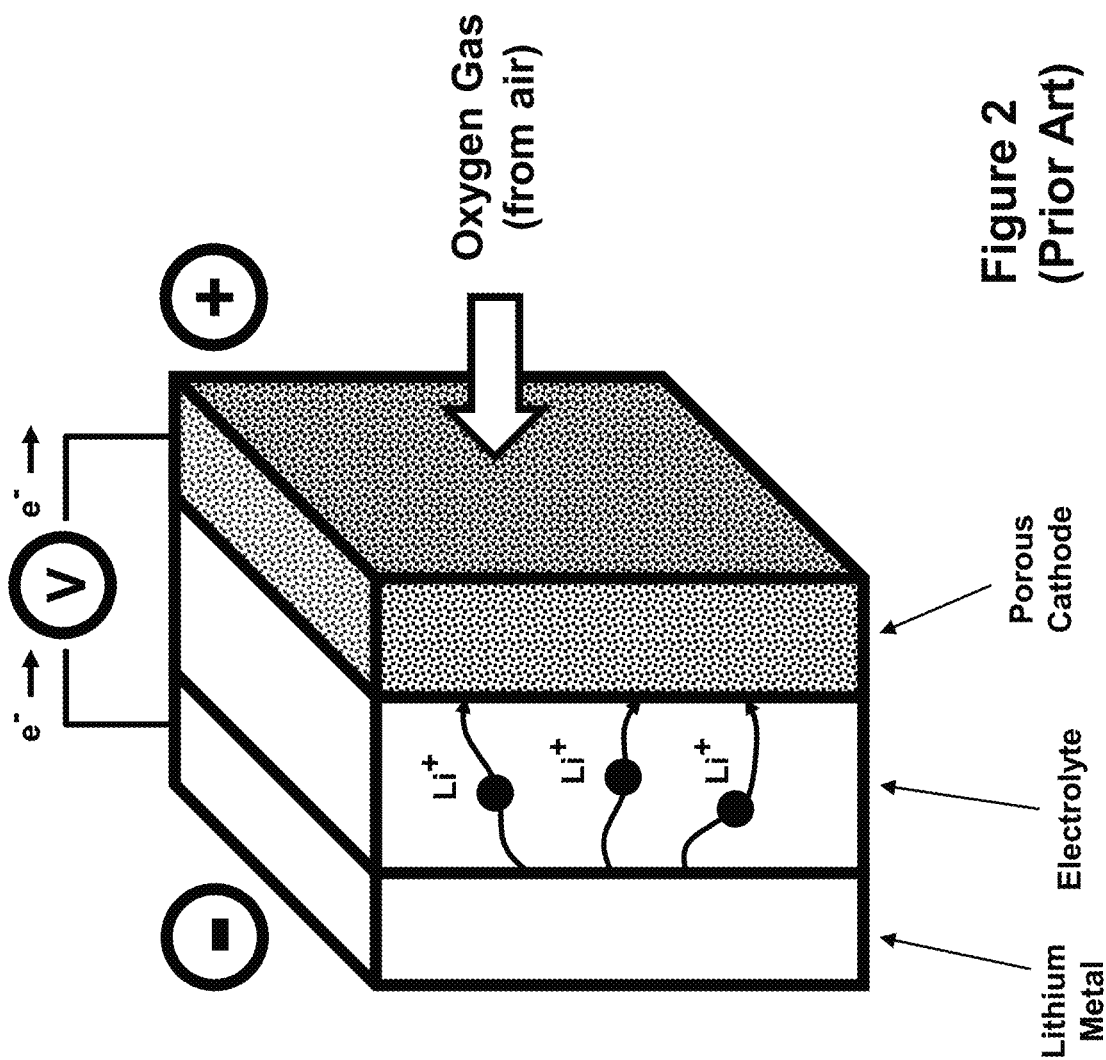
FIG. 2 illustrates the basic components of a Lithium-Air battery of the currently available technology.
Figure 3:
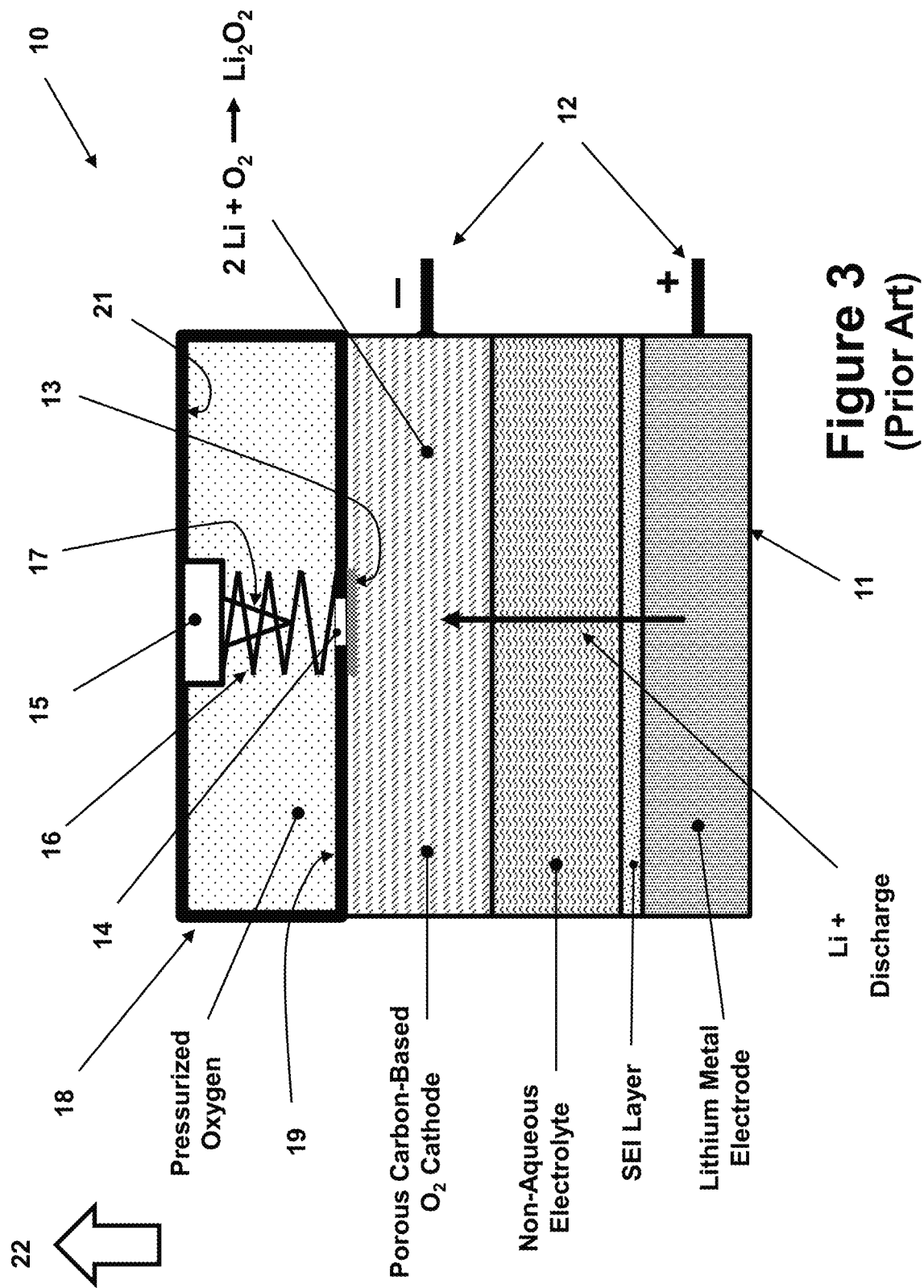
FIG. 3 illustrates the cross-sectional view of the basic prior art Lithium-Oxygen reserve battery embodiment with pressurized oxygen compartment.

In addition to being able to provide Li-Oxygen batteries with oxygen gas that is stored in a pressurized container as was described for the prior art embodiment of FIG. 3, oxygen may be generated through certain chemical reactions. For emergency situations and for needs of relatively short durations, the chemically combined oxygen sources have been of considerable utility. Such developed methods are characterized by prolonged storage life with consequent ease of logistics, the need for relatively simple regulatory equipment, and the ability to function with little or no auxiliary power.

Classically, the alkali metal halates (chlorates and perchlorates) have been used to prepare oxygen gas by thermal decomposition reactions. These materials are known to pyrolyze for the most part according to the overall reactions: $MClO_3 = MCl + 3/2\ O_2$ and $MClO_4 = MCl + 2O_2$. The oxygen availability for some of these compounds is presented in the Table I of FIG. 4 (M. M. Markowitz, D. A. Boryta, and Harvey Stewart, Jr., "Lithium Perchlorate Oxygen Candle. Pyrochemical Source of Pure Oxygen". *Ind. Eng. Chem. Prod. Res. Dev.* 3 (4): 321-330, 1964). Of the materials tabulated, lithium per-chlorate shows the highest potential oxygen content on both a weight (60.1%) and volume basis (1.45 grams of 02 per cc.) and actually contains about 27%, more oxygen per cc. than liquid oxygen itself. Lithium superoxide ($LiO_2$) and lithium ozonide ($LiO_3$) are included in Table I for the sake of completeness.

An oxygen generator that uses halates as an oxygen source is commonly called as a "chlorate candle", where the oxidation of a small amount of iron by sodium chlorate provides sufficient heat to decompose a considerable excess of sodium chlorate and yield substantially pure oxygen gas. Early attempts at the exploitation of this concept led to disastrous explosions and cast serious doubts on the inherent safety of these pyrochemically self-sustaining oxygen sources. However, later developments of this type of oxygen system resulted in a linearly burning composite of 92% $NaClO_3$, 4% steel wool, and 4% $BaO_2$, which yields about 40% available oxygen.

In an oxygen candle, such as one using lithium perchlorate as the oxygen source, a more energetic reducing agent may be used as the fuel component. Some data pertaining to readily available fuel elements are provided in the published literature (e.g., in M. M. Markowitz, D. A. Boryta, and Harvey Stewart, Jr., "Lithium Perchlorate Oxygen Candle. Pyrochemical Source of Pure Oxygen". *Ind. Eng. Chem. Prod. Res. Dev.* 3 (4): 321-330, 1964). On the basis of heat release, boron appears to be the most efficient fuel. However, the fuel ultimately to be used in conjunction with the oxygen source such as lithium perchlorate, must be capable of producing linearly propagating, smooth combustion with no serious side reactions interfering with the release of substantially pure oxygen. On these accounts the use of boron as a fuel in this application is not ideal and manganese metal powder, despite its lower heat of combustion, appears to provide the best compromise fuel component.

Sodium chlorate candles are a very efficient means of storing and generating oxygen with a mass of oxygen per unit of volume greater than compressed oxygen unless the pressure is above 4,000 psig (S. H. Smith, "NRP Report 5465, Chlorate Oxygen Candles. The Present Status of Chemical Research in Atmosphere Purification and Control on Nuclear-Power Submarines," Miller, R. R, Piatt, V. R., 1960). The volume efficiency of candles is almost equal to that of liquid oxygen without the dangers and equipment issues of cryogenic storage (e.g., J. C. White, "Atmospheric control in the true submarine. NRL Progress 5465, PB-161518," December 1958, and J. W. Mausteller, "Oxygen Generating Systems," *Kirk-Othmer Encyclopedia of Chemical Technology,* 1996).

The use of chlorates or perchlorates as sources of oxygen dates from at least 1930 when emergency oxygen supplies manufactured in Berlin for miners were described (S. H. Smith, "NRP Report 5465, Chlorate Oxygen Candles. The Present Status of Chemical Research in Atmosphere Purification and Control on Nuclear-Power Submarines," Miller, R. R, Piatt, V. R., 1960, and W. H. Schechter, et al., "Chlorate candles as a source of oxygen," Ind. Eng. Chem., vol. 32, 1950). During World War II, the Japanese introduced a chemical oxygen generator for aircraft pilot use. By 1945, sodium chlorate oxygen candles had been improved and tested by the US Navy. The candles were developed in part at the Naval Research Laboratory (NRL) and the Oldbury Electro-Chemical Corporation (S. H. Smith, "NRP Report 5465, Chlorate Oxygen Candles. The Present Status of Chemical Research in Atmosphere Purification and Control on Nuclear-Power Submarines," Miller, R. R, Piatt, V. R., 1960, and W. H. Schechter, et al., "Chlorate candles as a source of oxygen," Ind. Eng. Chem., vol. 32, 1950).

The most common commercial and military chemical oxygen generating candles are primarily composed of (by % weight): sodium chlorate (~74%), iron powder (~10%), barium peroxide (~4%) and a glass fiber binder (~12%). Iron acts as a fuel consuming some of the oxygen produced but it helps to maintain high temperatures in the ignition zone. Additional iron beyond 10% wt. is not oxidized and hence it does not aid the candle burning process. There is a low limit to the amount of iron needed to ensure a continued candle burn. This amount strongly depends on the geometry of the candle and the resulting heat loss to the surroundings relative to the heat generation rate. Generally, the smaller the candle diameter, the less the amount of iron that permits continued combustion. Chlorine gas is formed by an undesirable decomposition reaction of the chlorates and perchlorates. Barium peroxide ($BaO_2$) is used as an effective chlorine scavenger (W. H. Schechter, et al., "Chlorate candles as a source of oxygen," Ind. Eng. Chem., vol. 32, 1950) that produces barium chloride ($BaCl_2$) and oxygen. Cobalt hydroxide ($Co(OH)_2$) has shown to be effective as a possible replacement to barium peroxide (Y. Zhang, et al., "Chemical oxygen generator". U.S. Pat. No. 5,338,516, 10 Dec. 1992). Carbon monoxide and carbon dioxide can also be formed because of the presence of some carbon in the iron. However, the generation of these gases is greatly reduced by careful use of purified carbon free iron as the fuel (S. H. Smith, "NRP Report 5465, Chlorate Oxygen Candles. The Present Status of Chemical Research in Atmosphere Purification and Control on Nuclear-Power Submarines," Miller, R. R, Piatt, V. R., 1960). Since the chlorate material melts during the reaction, some inert material must be added to the candle to preserve its shape during use and as the clinker cools. The presence of glass fibers as a binder helps the cooling clinker to maintain its shape and avoid cracking (W. H. Schechter, et al., "Chlorate candles as a source of oxygen," Ind. Eng. Chem., vol. 32, 1950).

Sodium chlorate, $NaClO_3$ melts at approximately 248° C. and decomposes at 478° C. (J. W. Mausteller, "Oxygen Generating Systems," *Kirk-Othmer Encyclopedia of Chemical Technology,* 1996). Other chemicals occasionally used or mixed together are alkaline chlorate and perchlorates such as sodium perchlorate ($NaClO_4$), potassium chlorate ($KClO_3$), potassium perchlorate ($KClO_4$), lithium chlorate ($LiClO_3$), and lithium perchlorate ($LiClO_4$). Table 1 lists the most common materials that have been or could be used as a source of chemically generated oxygen along with their melting and decomposition temperatures. Table 2 summarizes the decomposition reactions of the chlorates and perchlorates and their corresponding standard enthalpies of reaction. The release of oxygen from either chlorates or perchlorates requires raising the material to substantial temperatures. The reactions are exothermic, but an additional energy source is generally required to form a sustained reaction. Increasing the reaction temperature increases the rate of oxygen production. In general, it can be assumed that approximately 200 calories of energy are released per gram of candle mixture (W. H. Schechter, et al., "Chlorate candles as a source of oxygen," Ind. Eng. Chem., vol. 32, 1950). The temperatures of the reaction zone lie within 500-600° C. and they are a function of the actual candle composition. The higher values sometimes for higher percentages of iron in the ignition zone.

TABLE 1

Melting and decomposition temperatures of alkaline chlorate and perchlorates used in oxygen chemical generation (J. W. Mausteller, "Oxygen Generating Systems," *Kirk-Othmer Encyclopedia of Chemical Technology,* 1996).

| Name | Formula | Weight | % oxygen* | T melt** | T decomp** |
|---|---|---|---|---|---|
| Sodium chlorate | $NaClO_3$ | 106.4 | 45% | 248° C. 261° C. | 478° C. |
| Sodium perchlorate | $NaClO_4$ | 122.4 | 52% | 266° C. 471° C. | 480° C. 482° C. |

TABLE 1-continued

Melting and decomposition temperatures of alkaline chlorate and perchlorates used in oxygen chemical generation (J. W. Mausteller, "Oxygen Generating Systems," *Kirk-Othmer Encyclopedia of Chemical Technology*, 1996).

| Name | Formula | Weight | % oxygen* | T melt** | T decomp** |
|---|---|---|---|---|---|
| Potassium chlorate | $KClO_3$ | 122.5 | 39% | 368° C. 357° C. | 400° C. |
| Potassium perchlorate | $KClO_4$ | 138.5 | 46% | 525° C. 588° C. | 400° C.*** |
| Lithium chlorate | $LiClO_3$ | 90.4 | 53% | 129° C. | 270° C. |
| Lithiium perchlorate | $LiClO_4$ | 106.4 | 60% | 236° C. 247° C. | 430° C. 410° C. |

TABLE 2

Decomposition reactions and corresponding standard enthalpies of reaction of alkaline chlorate and perchlorates used in oxygen chemical generation (J. W. Mausteller, "Oxygen Generating Systems," *Kirk-Othmer Encyclopedia of Chemical Technology*, 1996).

| Name | Reaction (one mole reactant) | ΔHf ° (reactant)* | ΔHf ° (chloride) | ΔHr ° kJ/mole)** |
|---|---|---|---|---|
| Sodium chlorate | $NaClO_3 \rightarrow NaCl + 3/2\, O_2$ | −366*** [−358] | −411 [−409] | −45 [−51] |
| Sodium perchlorate | $NaClO_4 \rightarrow NaCl + 2\, O_2$ | −383 [−384] | −411 [−409] | −28 [−25] |
| Potassium chlorate | $KClO_3 \rightarrow KCl + 3/2\, O_2$ | −398 | −436 [−435] | −38 [−37] |
| Potassium perchlorate | $KClO_4 \rightarrow KCl + 2\, O_2$ | −433 [−430] | −436 [−435] | −3 [−5] |
| Lithium chlorate | $LiClO_3 \rightarrow LiCl + 3/2\, O_2$ | —**** | −409 | —**** |
| Lithium perchlorate | $LiClO_4 \rightarrow LiCl + 2\, O_2$ | −381 [−380] | −409 | −28 [−29] |

Measurement of actual oxygen production for a candle indicate that approximately 94% of the potential theoretical oxygen bound in the chlorate is released by the candle (W. H. Schechter, et al., "Chlorate candles as a source of oxygen," Ind. Eng. Chem., vol. 32, 1950). However, this amount is slightly reduced to 88% by the oxidation of the iron fuel to iron oxides (FeO, $Fe_2O_3$, and $Fe_3O_4$).

It has been long known that the presence of various metal oxides function as catalysts for the decomposition reaction (W. H. Schechter, et al., "Chlorate candles as a source of oxygen," Ind. Eng. Chem., vol. 32, 1950). A catalyst would lower the reaction temperature for releasing oxygen and could lower the amount of iron fuel needed. Lower iron amounts would permit additional oxygen to be produced by the candle. A lower temperature candle would be inherently safer and most likely generate lower amounts of chlorine contaminant (J. W. Mausteller, "Oxygen Generating Systems," *Kirk-Othmer Encyclopedia of Chemical Technology*, 1996). A goal has long been to develop a no-fuel candle that uses the small exothermic heat from the decomposition reaction and careful management of heat loss to eliminate the need for metal fuel. The metal compounds (oxides, sulfates, chlorides in various cases) identified include manganese, copper, cobalt, nickel, chromium, and tin. Some of these metals, especially tin, nickel and cobalt, can serve as a fuel (starting in the pure state) and catalyst removing the need for the iron. Iron itself is known to act as a catalyst decreasing the decomposition temperature compared with heated pure sodium chlorate. The presence of these catalytic metal compounds caused the chlorate mixture to give off its oxygen at lower temperatures. Cobalt compounds produced the most significant decrease in temperature. As an example, 3.0% wt. $Co_3O_4$ and sodium chlorate decomposed in the temperature range 240° C. to 260° C., while a similar mixture with iron oxide decomposed in the range 300° C. to 380° C. and pure sodium chlorate 520° C. to 580° C. (Y. Zhan, et al., "Catalytic decomposition of alkali metal chlorates and perchlorates," *Recent Research and Development in Material Science*, vol. 1, 1998).

The preferred candle manufacturing process involves thoroughly mixing the dry ingredients, moistening with water (~1.5%-5% wt.), and pressing with a high-pressure ram (e.g., J. C. White, "Atmospheric control in the true submarine. NRL Progress 5465, PB-161518," December 1958, and J. K. Musick and P. R. Gustafson, "Chlorate candles. The present status of chemical research in atmosphere purification and control on nuclear-powered submarines," 1961). The higher the ram pressure, the higher the final candle density. From 5,000 to 12,000 psig the density of the candle rises from 2.1 to 2.27 g/ml. Increasing to 24,000 psig yields a density of 2.4 g/ml (a further 6% increase). The theoretical density of the sodium chloride is approximately 2.7 g/ml. To remove water, the candles had to be heated throughout, without raising the exterior temperature too high.

Figure 5:
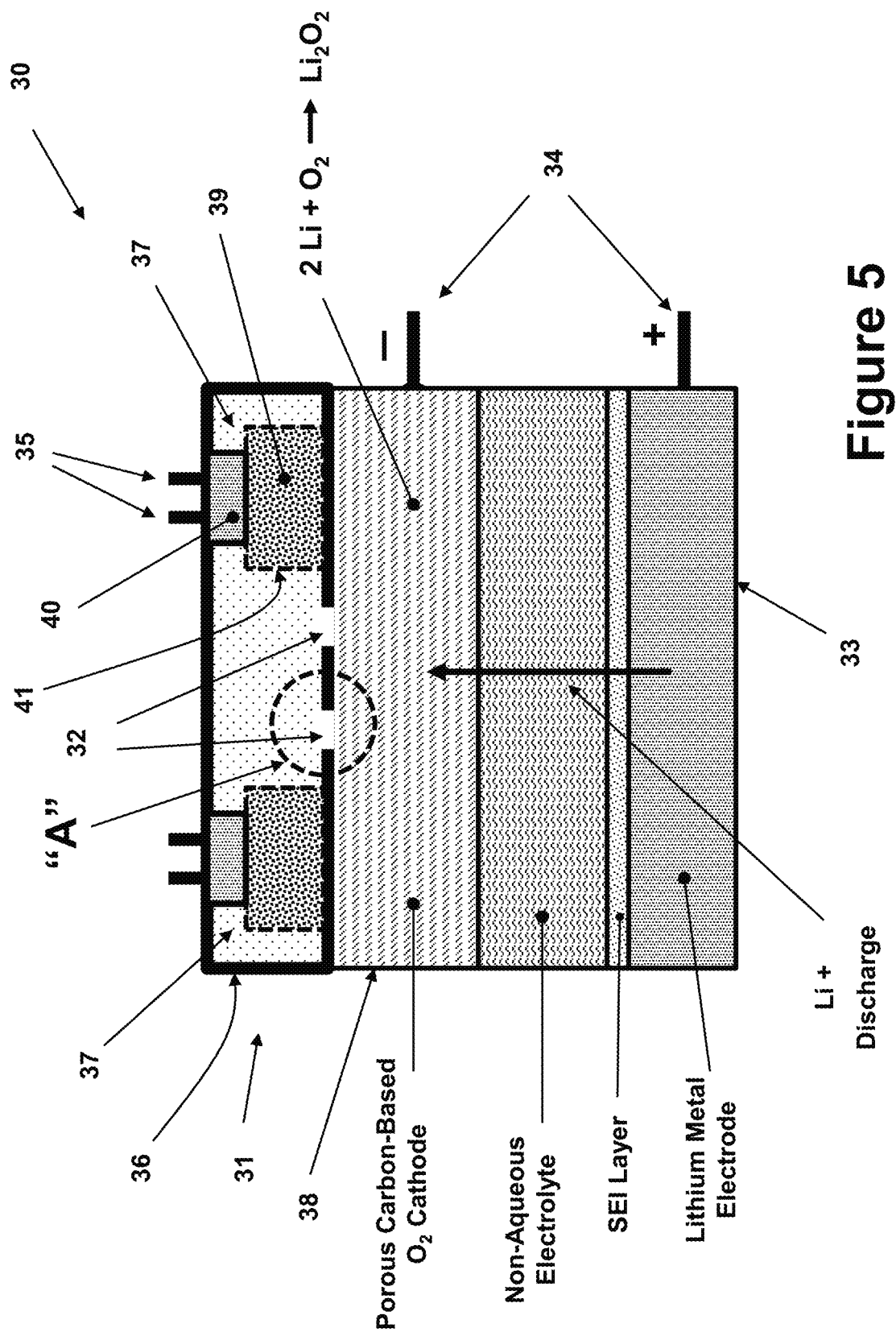
FIG. 5 illustrates the cross-sectional view of the first embodiment of the Lithium-Oxygen reserve battery with integrated oxygen generator.

A Li-Oxygen reserve batteries with integrated oxygen generators is herein described using the basic Li-Oxygen reserve battery embodiment 30 shown in the cross-sectional schematic of FIG. 5. All components of the Li-Oxygen reserve battery of the embodiment 30 of FIG. 5, i.e., its Lithium Metal Electrode compartment, SEI layer, Non-Aqueous Electrolyte compartment and the Porous Carbon-Based $O_2$ Cathode compartment, are similar to those of the embodiment 10 of FIG. 3 except for its Pressurized Oxygen compartment 18, which is replaced by the compartment 31 as described below. The porous carbon-based $O_2$ cathode is still a component of the battery core into which oxygen gas can be allowed to enter through the opening(s) 32 to activate the reserve battery.

All core components and the oxygen providing compartment 31 of the Li-Oxygen reserve battery are packaged, such as seamlessly, with the sealed housing 33. To achieve a hermetically sealed reserve battery with a shelf life of over 20 years, the battery terminals 34 and the electrical initiator terminals 35 described below can be provided with glass or other similar electrical insulation as they pass through the sealed housing 33.

In the oxygen generator integrated Lithium-Oxygen reserve battery embodiment 30 of FIG. 5, the oxygen generation process occurs in the compartment 31. The compartment 31 can have its own housing 36 with provided openings 32 to generate oxygen to enter the porous carbon-based $O_2$ cathode compartment of the battery. Within the compartment 31, at least one oxygen generating unit 37 is then provided. It is appreciated that for the sake of demonstrating the construction of the present oxygen generator integrated Lithium-Oxygen reserve battery embodiment 30, only two oxygen generating units are shown in the schematic of FIG. 5. However, a maximum amount of the interior volume of the compartment 31 can be utilized to be filled with oxygen generating units and other required components that are described later in this disclosure, thereby leaving minimal or a negligible amount of unfilled volume to maximize the amount of oxygen that can be generated per unit volume of the compartment 31. In general, any remaining volume in the compartment 31 may either be filled with an inert gas such as Argon or be vacuumed as part of the assembly process. The compartment 31 and the battery core housing 38 can share a common wall as shown in FIG. 5, in which the openings 32 are provided. In general, the housings 38 and compartment 31 housing are made with stainless steel with welded seams to ensure hermitic sealing of the battery.

The at least one oxygen generating unit 37 comprises an oxygen candle 39, which in the schematic of FIG. 5 is provided with an electrical pyrotechnic based initiation device 40. The electrical initiator 40 is initiated on demand by electrical energy supplied via the terminals 35, which can be used to heat a bridge wire to ignite the initiator pyrotechnic material. The ignited pyrotechnic material of the initiator 40 would activate the oxygen candle to begin to generate oxygen. The housing 41 of the oxygen candle is provided with opening(s) to allow the generated oxygen to escape into the compartment 31, and thereby through the openings 32 into the porous carbon based $O_2$ cathode compartment of the reserve battery core.

The Li-Oxygen reserve battery embodiment 30 operates as follows. In normal conditions, the battery has no oxygen to generate electrical energy and is therefore inactive. Then when at least one oxygen generating unit 37 is activated on command (by initiating the initiator 40 in the embodiment 30 of FIG. 30 or by an inertial igniter as is described for the following embodiment), the generated oxygen gas would begin to flow into the porous carbon-based $O_2$ cathode section of the battery core through the openings 32 and activate the reserve battery. In addition, it has been extensively reported (for example, J. Read, K. Mutolo, M. Ervin, W. Behl, J. Wolfenstine, A. Driedger and D. Foster, "Oxygen Transport Properties of Organic Electrolytes and Performance of Lithium/Oxygen Battery," *Journal of Electrochemical Society*, vol. 150, no. 10, pp. A1351-A1356, 2003) that a higher oxygen partial pressure improves battery capacity, especially at high discharge rates, by increasing the oxygen saturation concentration in the liquid electrolyte and by enhancing the oxygen diffusion rates in the porous cathode active sites. Therefore, it is advantageous to feed essential pure generated oxygen gas into the battery core and allow the generated gas to be pressurized by proper sizing of the oxygen generating units 37 and the compartment 31 volume for a given battery core size and construction.

The Lithium-Oxygen reserve battery with integrated oxygen generator embodiment 30 of FIG. 5 is assembled in an inactive state with at least one integrated oxygen generating units 37 as described above. As a result, as long as any of the provided oxygen generating units 37 is not initiated, the battery stays in its inactive state, thus serving as a reserve battery. Then once an oxygen generating unit 37 is initiated, the generated oxygen would quickly enter the porous carbon based $O_2$ cathode compartment of the battery and would immediately starts the reduction/oxidation reactions inside the battery core and, as a result, a voltage differential is established across the anode and cathode sides of the cell. In the porous carbon cathode electrode, oxygen is reduced to lithium peroxide that accumulates in the pores of the electrode. At the same time, lithium metal from the anode electrode is oxidized to lithium ions, which transport to the cathode electrode through the liquid electrolyte and polymeric separator to the porous carbon cathode electrode. The battery discharge reactions will continue until available oxygen or the available Li metal is consumed.

Figure 6:
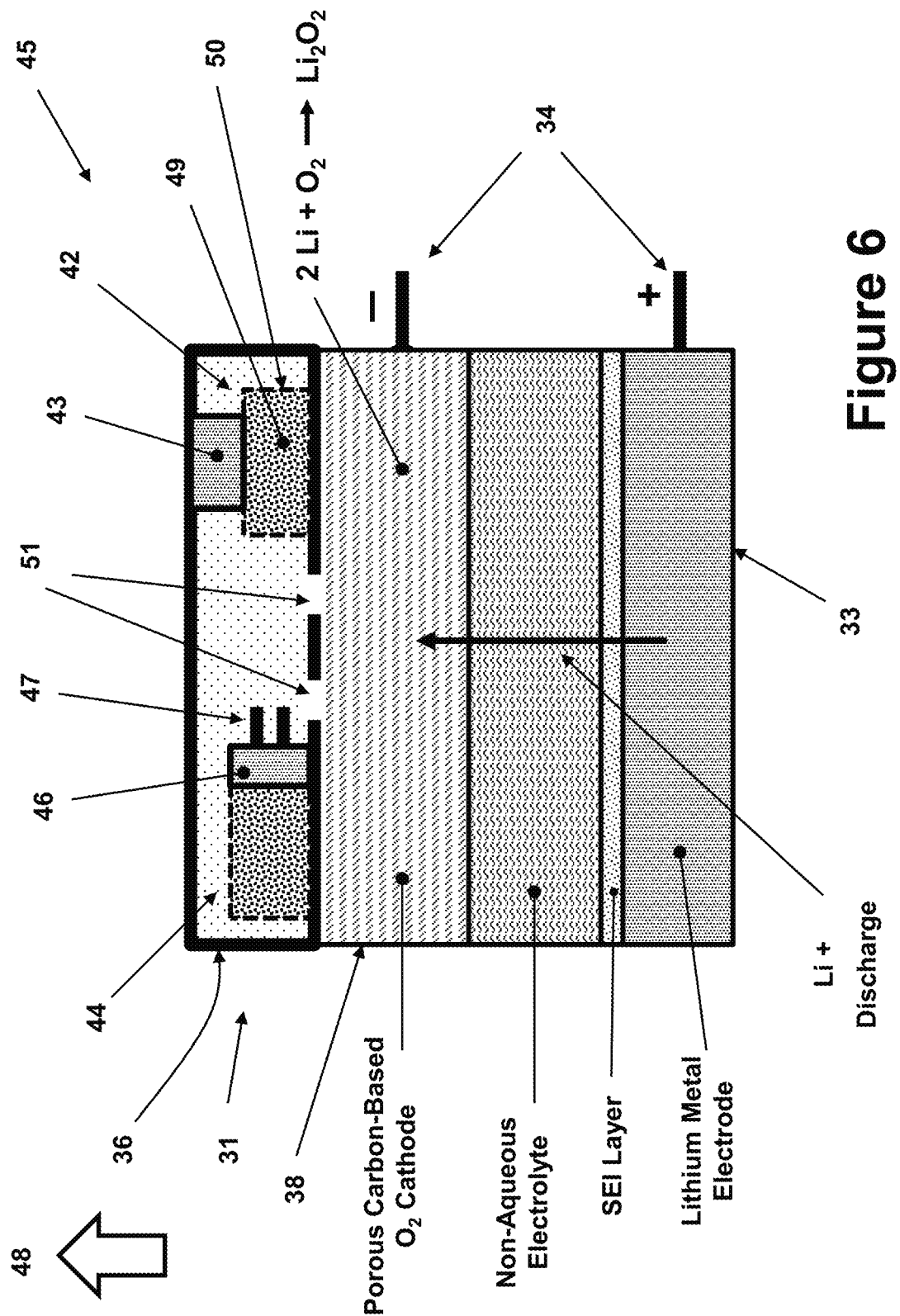
FIG. 6 illustrates the cross-sectional view of a modified Lithium-Oxygen reserve battery with integrated oxygen generator embodiment of FIG. 5 configured to be initially activated by an inertial igniter.

A modified Lithium-Oxygen reserve battery with integrated oxygen generator embodiment 30 of FIG. 5 with integrated inertial type igniters for initiating the first oxygen generating unit of the reserve battery is shown in the cross-sectional view of FIG. 6 and indicated and indicated generally with reference character 45. All components of the Lithium-Oxygen reserve battery embodiment 45 are similar with those of the embodiment of FIG. 5 except for the oxygen generators (37 in FIG. 5) used in the oxygen generation compartment 31 and methods of their initiation as described below.

The modified Lithium-Oxygen reserve battery with integrated oxygen generator embodiment 45 can be used for gun fired munitions, mortars and rockets applications since inertial igniters, such as those disclosed in U.S. Pat. Nos. 7,437,995; 7,587,979; 7,587,980; 7,832,335 and 8,061,271 and U.S. patent application Ser. Nos. 12/774,324; 12/794,763; 12/835,709; 13/180,469; 13/207,280 and 61/551,405 (the full disclosure of each of which being incorporated herein by reference) or piezoelectric-based inertial igniters such as those disclosed in U.S. Pat. No. 8,024,469 and U.S. patent application Ser. Nos. 13/186,456 and 13/207,355 the full disclosure of each of which being incorporated herein by reference), can be used to initiate the first oxygen generating unit of the battery from the firing setback acceleration as described later in this disclosure without the need of external power sources such as batteries for initiating an electrical initiator as was described for the embodiment 30 of FIG. 5.

In the modified oxygen generator integrated Lithium-Oxygen reserve battery embodiment 45 of FIG. 6, the oxygen generation process still occurs in the compartment 31. The compartment housing 36 also similarly provided with the openings 32 (FIG. 5). Within the compartment 31, at least one aforementioned oxygen generating units 42 (37 in FIG. 5, but as equipped with an inertial igniter 43) is provided. Similar to the oxygen generating units 37 of the embodiment 30 of FIG. 5, the oxygen generating units 42 comprises oxygen candles 50 that are assembled inside a housing 50 that allows the generated oxygen to exit into the compartment 31. Although a single oxygen generating unit 42 having an inertial igniter 43 is shown, a plurality of the same can be used. In addition to the oxygen generating unit 42, one or more similar oxygen generating units 44 are provided, which are equipped with electrical initiation units 46. In FIG. 6, the terminals 47 indicate those for powering the initiation process of the electrical initiator 46.

The Li-Oxygen reserve battery with integrated oxygen generator embodiment 45 of FIG. 6 operates as follows. In normal conditions, the battery has no oxygen to generate electrical energy and is therefore inactive. If the device to which the reserve battery 45 is attached is accelerated (for example due to the setback acceleration in the case of gun fired munitions) in the direction of the arrow 48, the acceleration would act on the inertial igniter as described in the aforementioned inertial igniter patents and if the acceleration in the direction of the arrow 48 is high enough in magnitude and long enough in duration as prescribed for the detection of the desired event upon which the battery is to be activated (corresponding to the all-fire condition for the case of munitions), the pyrotechnic element of the inertial igniter (for example a percussion primer) is ignited, thereby initiating the oxygen candle 49 of the oxygen generating unit 42. The generated oxygen gas would then begin to flow into the porous carbon-based $O_2$ cathode section of the battery core through the provided openings 51 and activate the reserve battery. If amplitude of the applied acceleration in the direction of the arrow 48 is lower than the prescribed magnitude or if the duration of the applied acceleration in the direction of the arrow 48 is shorter than prescribed duration, for example due to accidental drop of the object to which the reserve battery 45 is attached, the inertial igniter 43 would not initiate and the reserve battery stays inactive.

Within the compartment 31, at least one other oxygen generating unit 44 may then be provided. It is appreciated that for the sake of demonstrating the construction of the present oxygen generator integrated Lithium-Oxygen reserve battery embodiment 45, only one added oxygen generating unit 44 is shown in the schematic of FIG. 6. However, in practice, the maximum amount of interior volume of the compartment 31 is desired to be filled with oxygen generating units and other required components that are described later in this disclosure, thereby leaving minimal or a negligible amount of unfilled volume to maximize the amount of oxygen that can be generated per unit volume of the compartment 31. In general, any remaining volume in the compartment 31 may either be filled with an inert gas such as Argon or be vacuumed as part of the assembly process. Similar to the embodiment of FIG. 5, the compartment 31 and the battery core housing 38 can share a common wall as shown in the embodiments of FIG. 6, in which the openings 51 are provided. In general, the housings 38 and compartment 31 housing are made with stainless steel with welded seams to ensure hermitic sealing of the battery.

The at least one another oxygen generating unit 44 is provided with an electrical initiator 46 with initiation powering terminals 47 similar to the electrical initiators 40 of the Li-Oxygen reserve battery with integrated oxygen generator embodiment of FIG. 5. The electrical initiator 46 may be initiated using one of the following processes:

1—The electrical initiator 46 may be connected directly to the reserve battery terminals, such as via internal wirings, and is provided with an electronic switch that detects the battery voltage and/or current that it can generate and when the battery is detected to lose power, then the electrical initiator 46 is automatically initiated. Drop in oxygen pressure below a prescribed threshold may also be used to initiate oxygen generating unit(s) 44.

2—The electrical initiator 46 may be positioned as the electrical initiator 40 of the embodiment 30 of FIG. 5, i.e., the terminals 47 being brought out of the compartment 31 are the terminals 35 in FIG. 5. Then an external electronics circuit, can be operated by a programmable microprocessor, would detect the powering condition of the reserve battery, and would initiate the electrical initiator 46 by a command.

The Lithium-Oxygen reserve battery with integrated oxygen generator embodiment 45 of FIG. 6 is assembled in an inactive state. As a result, as long as none of the provided oxygen generating units 42 or 44 is initiated, the battery stays in its inactive state, thus serving as a reserve battery. Then once the initial oxygen generating unit 42 is initiated due to the detection of the prescribed acceleration profile in the direction of the arrow 48 by the inertial igniter 43, the generated oxygen would quickly enter the porous carbon based $O_2$ cathode compartment of the battery and would immediately start the reduction/oxidation reactions inside the battery core and, as a result, a voltage differential is established across the anode and cathode sides of the cell. In the porous carbon cathode electrode, oxygen is reduced to lithium peroxide that accumulates in the pores of the electrode. At the same time, lithium metal from the anode electrode is oxidized to lithium ions, which transport to the cathode electrode through the liquid electrolyte and polymeric separator to the porous carbon cathode electrode and thereby power the battery load. The battery discharge reactions will continue until available oxygen or the available Li metal is consumed.

All core components and the oxygen providing compartment 31 of the Li-Oxygen reserve battery 45 are packaged, such as seamlessly, with the housing 33. To achieve a hermetically sealed reserve battery with a shelf life of over 20 years, the battery terminals 34 and the electrical initiator terminals (if any) can be provided with glass or other similar electrical insulation as they pass through the sealed housing 33.

It is appreciated by those skilled in the art that the compartment 31 of the embodiment of at least FIGS. 5 and 6 may be divided into otherwise sealed sections and each section be provided with at least one oxygen generating unit. In some applications, this construction of the compartment 31 can be used, such as when the oxygen generation rate has to be high at a certain point of reserve battery operation, which can lead to high oxygen generating unit temperatures.

In the Lithium-Oxygen reserve battery with integrated oxygen generator type embodiments like those of embodiments 30 and 45 of FIGS. 5 and 6, respectively, the oxygen generation compartment 31, whether constructed as a single unit or divided into individual sections with their individual oxygen generating units, the openings to allow oxygen into the battery core (32 in FIGS. 5 and 51 in FIG. 6) may be provided with one-way valves to serve several possible functions that may be necessary for certain applications. The one-way valves are intended to prevent flow of gas or other material from the battery core into the compartment 31 but allow the generated oxygen to flow into the battery core. Such one-way valves are well known in the art and almost any type compatible with the battery chemistry and operating temperature may be used. For this reason, a spring loaded one-way valve is used to describe the function and operation of the battery with the provided one-way valves without limiting the embodiments to the use of the described one-way valve only. The indicated spring-loaded one-way valve is shown in the blow-up view "A", FIG. 5, shown in the schematic of FIG. 7.

Figure 7:
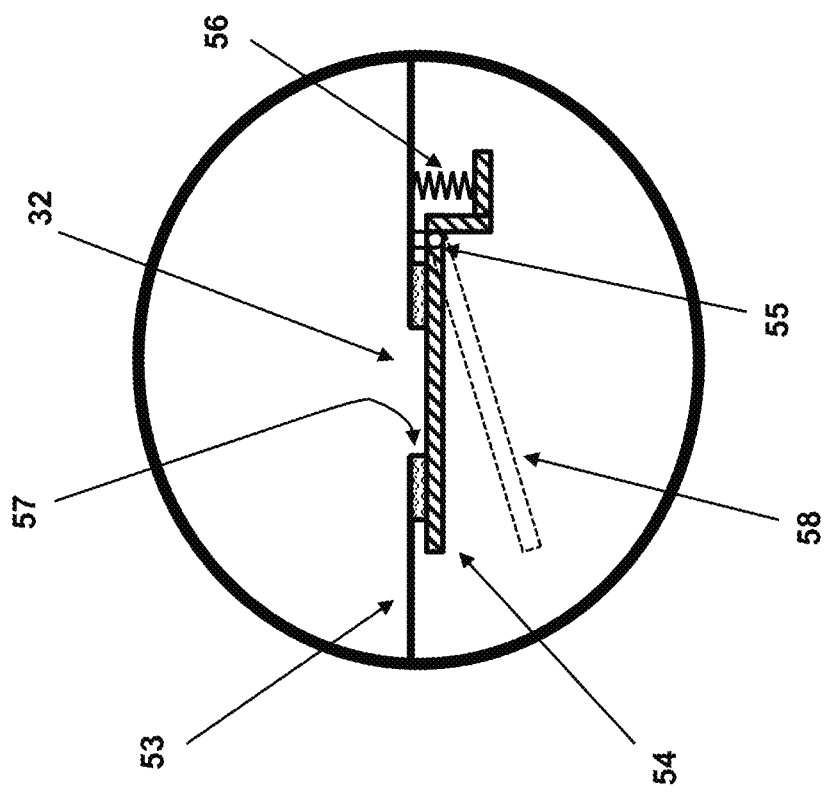
FIG. 7 illustrates a blow-up view of a one-way valve to allow generated oxygen from the generation compartment(s) into the battery core.

As can be seen in the blow-up view of FIG. 7, the presented one-way valve comprises a rotary flap 54 (shown in the closed configuration of the valve as solid lines), which is attached to the inside surface of the bottom wall 53 of the compartment 31 by the rotary joint 55, which may be a living joint. The rotary flap 54 is provided with a slightly preloaded compressive spring 56 (which can be integral with the living joint), which in normal conditions would force the flap 54 against the outside surface of the bottom wall 53 via the sealing gasket 57, to close and seal the inlet 32 (51 in FIG. 6). Then when the corresponding section of the compartment 31 begins to generate oxygen gas, the oxygen gas pressure would act of the surface of the flap 54 through the opening 32, and force the flap 54 to rotate as shown in dashed line and indicated by the numeral 58, allowing the oxygen gas to enter into the battery core.

It is also appreciated that by dividing the volume of the compartment 31 into several sections with their own at least one oxygen generating units (42 and 44 in FIG. 6), then when oxygen is generated in one section, the generated oxygen is forced into the battery core through the section on-way valve(s), FIG. 7, and does not have to fill the volume of other oxygen generating sections. As a result, maximum oxygen pressure is achieved inside the battery core with a significantly less generated oxygen gas. When one section has exhausted its oxygen generation capability, then its one-way valve(s) are closed and the oxygen generated by the oxygen generating unit(s) of the next section can be activated to begin to similarly supply oxygen gas to the battery core.

It is also appreciated by those skilled in the art that the oxygen candle, such as 49 in FIG. 6, once activated, for example by ignition of an inertial igniter 43 or electrical initiator 46, FIG. 6, would begin to generate oxygen in an exothermic process. For this reason, the generated oxygen gas entering the battery core through the provided openings 51, FIG. 6, which may or may not be provided with one-way valves, such as the one shown in FIG. 7, may be at temperatures that are higher than those that are desired to enter the battery core. This can be concerning when the battery must operate in relatively high temperature environments. High oxygen temperature generally can negatively affect the performance of the metal-oxygen batteries. The maximum oxygen temperature that a battery can tolerate with negligible performance reduction is dependent on the battery chemistry, geometry, and the packaging of its components.

To limit the temperature of the generated oxygen gas that enters the battery core, the oxygen generating units (42 and 44 in FIG. 6) can be configured to limit the rate of oxygen generation to the required level and to provide the means of dissipating the generated heat during its exothermic process as described later in this disclosure. In addition, when the battery has to operate in relatively high temperature environments, bi-metal or shape memory type valves may be provided at the openings (51 in FIG. 6) to prevent or limit the rate of oxygen flow into the battery core, thereby allowing enough time for the oxygen gas to drop to or below the desired high temperature limit. A valve such as a bi-metal or shape memory alloy type valve is shown in the schematic of FIG. 8.

Figure 8:
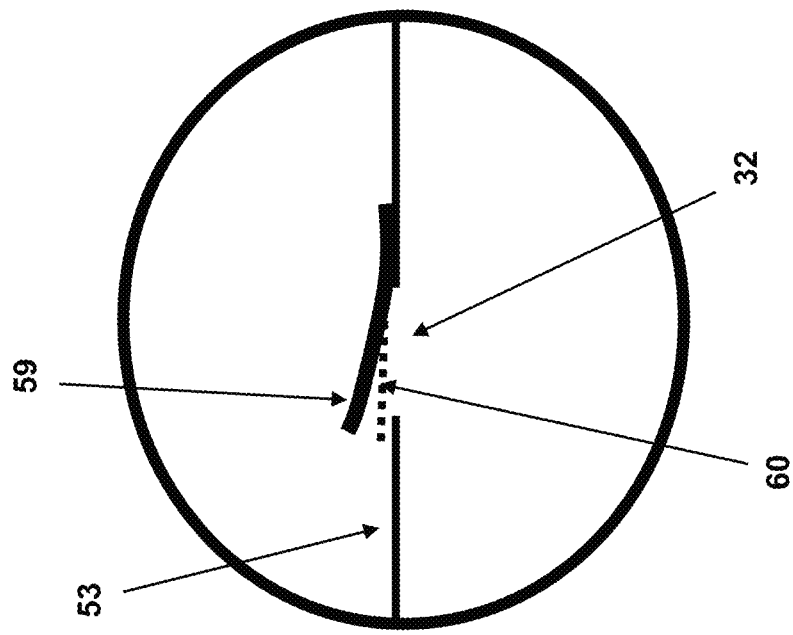
FIG. 8 illustrates a blow-up view of a bi-metal or shape memory valve to close/slow the flow of generated oxygen from the generation compartment (sections) into the battery core.

As can be seen in the blow-up view schematic of FIG. 8, the valve comprises the bi-metal or shape memory alloy leaf 50, which is fixedly attached to the inside surface of the bottom wall 53 of the compartment 31 over the openings 32, FIG. 5 (51 in FIG. 6). In normal conditions (shown in solid lines), and as can be seen in FIG. 8, the leaf 59 is formed to allow the oxygen gas that is generated in the compartment 31 or its provided sections to freely flow into the battery core as was previously described. However, if the oxygen gas temperature begins to increase above a predetermined level, then the leaf 59 would begin to deform towards its configuration 60 shown in dashed line in FIG. 8, and begin to restrict the flow of the generated oxygen gas into the battery core. As a result, the oxygen gas is provided with the required time to cool down below the indicated high level before entering the battery core. In general, such valves can be configured to almost completely close the flow of the generated oxygen into the battery core when the oxygen gas temperature reaches a threshold ("high") level.

It is appreciated by those skilled in the art that the present bi-metal based valves can be generally configured to close continuously as the passing oxygen gas temperature is increased, FIG. 8. On the other hand, the shape memory alloy based valves can be configured to close rapidly when a prescribed temperature threshold has been reached. It is also appreciated that the present valves can be configured with a combination of bi-metal section (such as for the frontal portion of the leaf 59, FIG. 8, and a shape memory alloy section (such as for attaching the frontal bi-metal section to the inside surface of the bottom wall 53 of the compartment 31 over the openings 32. As a result, if the temperature of the passing generated oxygen gas is higher than the prescribed temperature threshold, the oxygen flow is rapidly reduced or diminished by the actuation of the shape memory alloy section of the leaf 59. The bi-metal section of the leaf 59 would otherwise reduce the oxygen flow as its temperature rises but before reaching the prescribed shape memory alloy activation threshold.

Figure 9:
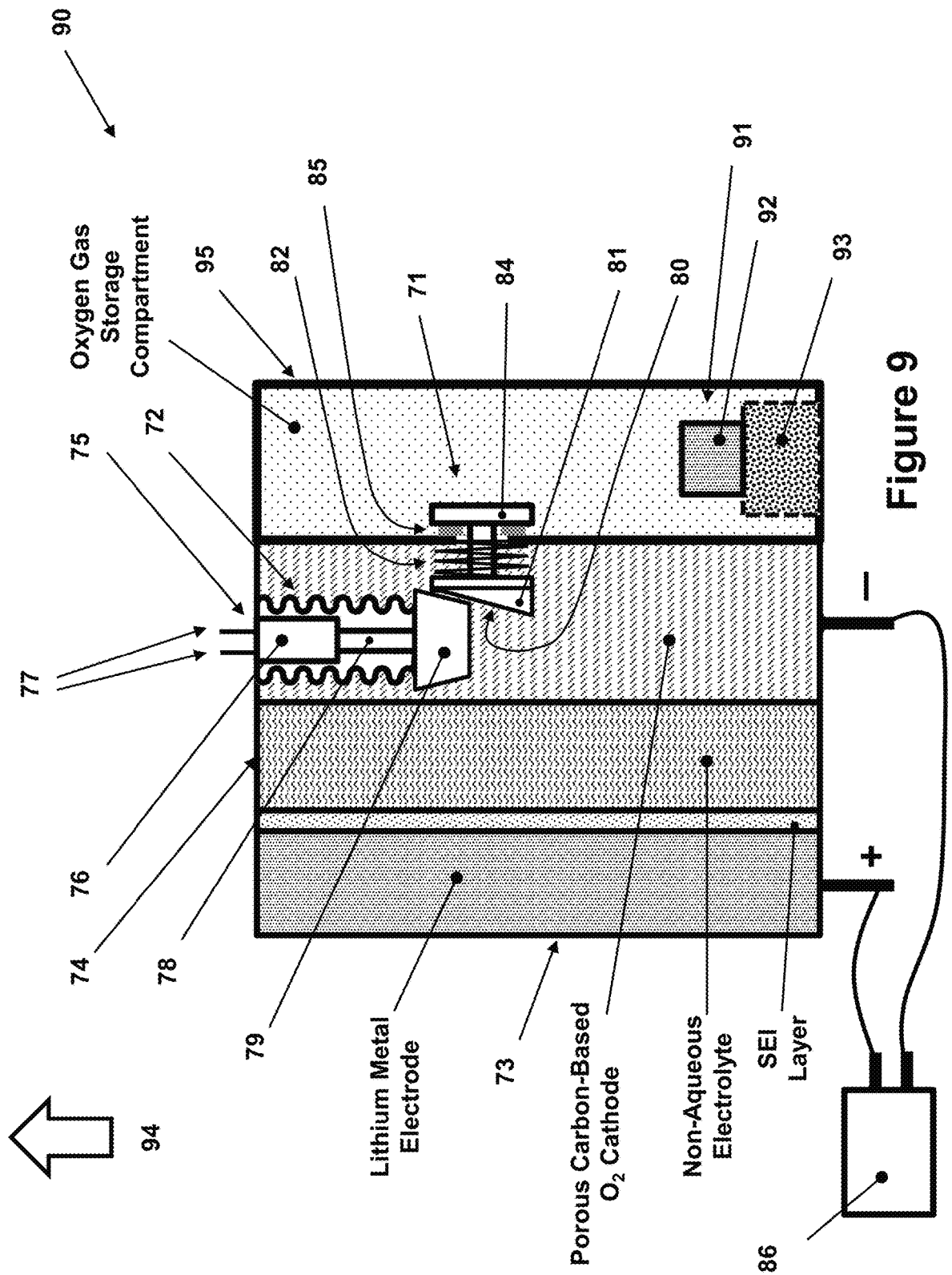
FIG. 9 illustrates the cross-sectional view of another embodiment of the Lithium-Oxygen reserve battery with integrated oxygen generator.

FIG. 9 illustrates the cross-sectional view of another Lithium-oxygen (Metal-Oxygen) reserve battery with integrated oxygen gas generator(s) embodiment with integrated oxygen generator unit(s), indicated as the embodiment 90. In this embodiment, the reserve battery is initially activated either inertially when subjected to a prescribed acceleration profile or by external power with activation/deactivation on command capability or by an electrical initiator as described below.

To illustrate the embodiment 90 type of Lithium-oxygen reserve batteries of FIG. 9, the prior art Lithium-oxygen reserve battery of FIG. 3A is used as the basis and provided with the required changes and functional modifications. In the schematic of FIG. 9, all components of the battery are similar to those of the embodiment of FIG. 3A except that no pressurized gas is provided in the container 95, FIG. 9, and for the addition of at least one oxygen generating unit 91. In the embodiment 90, the container 95 is initially in vacuum or filled with as low a pressure as possible inert gas such as argon and is used to store oxygen gas that is generated by the at least one oxygen generator unit 91.

The Li-Oxygen reserve battery with integrated oxygen generator units(s) type of embodiment 90 of FIG. 9 can be configured and operated as follows. The oxygen gas storage compartment 95 is in vacuum or close to vacuum state with an inert gas such as argon. At least one inertially activated oxygen generator unit 91 (similar to the unit 42 of the embodiment of FIG. 6) or at least one electrically initiated oxygen generator unit (similar to the units 37 of the embodiment of FIG. 30) is provided in the oxygen gas storage compartment 95. Thus, since there is no oxygen available to the battery core, the Li-Oxygen reserve battery 70 is therefore in its inactive state and provides a long shelf life that can significantly exceed the military required 20 years.

Then in pre-activation conditions, as was described for the embodiment of FIG. 3A, the valve 71 is in its closed state and prevents oxygen gas from entering the porous carbon-based $O_2$ cathode of the battery core. In this state, the biasing force of the compressively preloaded spring 82 ensures that the valve 71 stays closed.

Now if the device to which the reserve battery 90 is attached is accelerated in the direction of the arrow 94, the acceleration would act on the inertial igniter 92 and if the magnitude of the acceleration in the direction of the arrow 94 and its duration are at or above the prescribed levels for battery activation, then the inertial igniter would be configured to initiate the oxygen candle 93. Such acceleration would also act on the inertia of the mass member 79 and the solenoid core 78, generating a downward dynamic force as seen in the view of FIG. 9. The biasing spring in the solenoid 76 (not shown) is preloaded such that when the acceleration in the direction of the arrow 94 has reached a prescribed threshold, then the generated dynamic force would overcome the spring preload and the assembly of the mass member 79 and the solenoid core 78 would begin to move down as viewed in FIG. 9. If the magnitude of the acceleration in the direction of the arrow 94 and its duration are at or above the prescribed levels for battery activation, then the bellow 72 begins to deform, allowing the mass member 79 to move down, thereby engaging the sloped surface 80 of the member 79 and forcing it to begin to move to the right in the view of FIG. 9. As a result, the cap 84 is lifted from over the elastomeric gasket 85, thereby allowing the generated oxygen gas to begin to flow into the porous carbon-based $O_2$ cathode section of the battery core and activate the reserve battery. Then once the acceleration in the direction of the arrow 83 has ceased, the mass member 79 is forced to return to its pre-acceleration position shown in FIG. 9 by the preloaded biasing spring of the solenoid 76, the extended bellow 72, preloaded compressive spring 82 and the oxygen gas pressure, thereby closing the valve 71 and stopping the flow of oxygen gas into the battery core.

If the applied acceleration in the direction of the arrow 94 is below the prescribed threshold, for example due to accidental drop of the object to which the reserve battery 90 is attached, the preloading level of the aforementioned biasing tensile springs are not overcome, and the mass member 79 assembly dose not engage the sloped surface 80 of the member 79 and the valve 71 stays closed and the inertial igniter 92 is also not activated and therefore no oxygen gas is generated.

The reserve battery with integrated oxygen generator 90 is generally provided with proper electronic and drive components and a capacitor or other energy storage device (as shown collectively as the member 86 in FIG. 9), for sensing the reserve battery 90 power level and keep the battery operational as needed by supplying the battery core with oxygen via the solenoid 76 actuation. When no external power is available, the capacitor or super-capacitor is charged by the initial activation of the battery following the inertial igniter activation as described above and initiation of the oxygen candle and generation of oxygen gas. The valve 71 and its inertial and solenoid 76 based actuation mechanism are configured to allow enough oxygen into the battery core to generate enough electrical energy to charge the capacitor or super-capacitors for continuous operation of the reserve battery 90. It is appreciated that all components of the member 86 may be integrated inside the reserve battery housing. Such self-contained Li-Oxygen reserve batteries would greatly simplify their integration into various devices such as gun-fired munitions.

The actuation mechanism of the Lithium-Oxygen reserve battery with integrated oxygen generator embodiment 90 of FIG. 9 comprises a metallic bellow 72, such as being formed from the same metal with the battery core housing 73 is constructed, such as stainless steel. The bellow 72 is fixedly attached to the side surface 74 of the battery core housing 73, such as by welding of brazing, and the attachment is tested to ensure that is fully sealed. The bellow 72 is provided with a sealed cap 75, which may be integral to the bellow 72. A linear solenoid actuator 76 (or a piezoelectric or the like electrically actuated device) is positioned inside the bellow and fixed to the cap 75 as can be seen in FIG. 9. In FIG. 9, the terminals 77 indicate the powering terminals of the solenoid 76, which are passed through the electrical insulations (not shown) provided in the cap 75. The actuating core 78 of the solenoid 76 is then attached to a conical section shaped mass member 79. The mass member 79 is fixedly attached and sealed to the bellow 72. The conical section of the mass member 79 is positioned close or in contact with the sloped surface 80 of the member 81 of the normally closed valve 71 as can be seen in FIG. 9. The solenoid 76 is provided with a proper return spring so that while it is not energized, the mass member 79 is at the position shown in FIG. 9 and does not force the valve 71 to open. The cap 75 may be provided with a small hole to prevent the air (gas) trapped inside the below 72 from resisting its extension.

The linear solenoid actuator 76 (or other similar linear or rotary actuators) may be of latching type. In which case, following initial inertial activation and once the battery is activated, the solenoid actuator may be activated and held in its activated position without requiring continuous power. The solenoid may also be actuated less than the distance that activates the latching mechanism, thereby providing the capability to reactivate the reserve battery several times until it is desired to stay permanently activated, at which time the solenoid is actuated to the point of activating its latching mechanism.

In the Li-Oxygen reserve battery with integrated oxygen generator embodiment 90 of FIG. 9, the inertial activation in response to the prescribed acceleration profile as was previously described is configured to allow enough oxygen gas into the battery core to power the device electronics and power control system and to operate the solenoid 76 to open and close the valve 71 when needed to supply the required electrical energy. The reserve battery with integrated oxygen generator embodiment 90 may also be provided with a capacitor or super-capacitor (not shown) to form a "Lithium-Oxygen hybrid reserve battery", in which part of the electrical energy generated by the battery may be stored and used to provide high power pulse to certain loads or used to power low power electronics for a considerable lengths of time, such as for hours or days.

In the prior art Lithium-Oxygen reserve battery with integrated oxygen generator embodiment 90 of FIG. 9, the inertial activation in response to a prescribed acceleration profile is configured to allow enough oxygen gas into the battery core to power the device electronics and power control system and to operate the on/off activation actuation device, in this case the solenoid 76. Alternatively, the Lithium-Oxygen reserve battery embodiment 90 may be paired as was previously described with a capacitor (or supercapacitor) provided in the member 86, which is charged by the electrical energy generated by the initial activation of the reserve battery. The electrical energy stored in the capacitor can then be used by the object to which the reserve battery is attached (e.g., a gun fired munition), and to re-activate the reserve battery as needed by the actuator 76. Such a combined Lithium-Oxygen reserve battery and capacitor (super-capacitor) reserve power source forms the aforementioned "Lithium-Oxygen hybrid reserve battery".

It is appreciated that such "Lithium-Oxygen hybrid reserve batteries" can be advantageous for use in applications in which they are required to provide low power for long periods of times and that only occasionally they have to provide high power, such as for relatively short periods of time. In such applications, the reserve battery only needs to be activated for very short periods of times to charge the capacitor (or supercapacitor) and have the capacitor supply the low power to low power electronics for hours and sometimes for days until either high power is required to be provided or when the capacitor (or supercapacitor) power is low and it needs to be recharged, at which time the capacitor (or supercapacitor) supplies power to the activation actuator, in this case the solenoid 76.

The above "Lithium-Oxygen hybrid reserve batteries" may be provided with an electronic control circuit and microprocessor with enough memory (shown schematically in the member 86) to detect the voltage level of the hybrid reserve battery, and an electrical energy storage capacitor or super-capacitor (e.g., in the member 86), FIG. 9. The reserve battery may then be activated, for example inertially as was described above, to allow enough oxygen gas to flow into the battery core to charge the provided capacitor or supercapacitor to a prescribed level. The electronic control circuit and microprocessor can then be powered and memory and be programmed to provide a prescribed power level based on some sensory input and/or planned profile.

It is also appreciated by those skilled in the art that the Lithium-Oxygen reserve battery with integrated oxygen generator embodiment 90 may be provided with an oxygen generating unit with an electrical igniters, such as the oxygen generating unit 37 of FIG. 5, the oxygen candle 39 of which may then be initiated by an external power source on demand. The linear solenoid actuator 76 (or other similar linear or rotary actuators) may then be at least initially be powered to activate the battery on demand by allowing oxygen gas to enter the battery core as was previously described.

It is appreciated by those skilled in the art that the oxygen gas storage compartment of the Lithium-Oxygen reserve battery with integrated oxygen generator embodiment 90 may be provided with at least one oxygen generating unit with inertial initiation, such as the unit 42 in FIG. 6, and at least one oxygen generating unit with electrical initiation, such as the unit 44 in FIG. 6, to provide oxygen gas to the battery core on demand as it was described for the embodiment 45 of FIG. 6.

It is also appreciated by those skilled in the art that the oxygen gas storage compartment of the Lithium-Oxygen reserve battery with integrated oxygen generator embodiment 90 may divided into several separate compartments with their own oxygen generating units, such as it was described for the previous embodiments. As a result, oxygen gas pressure can be kept higher in each section of the oxygen gas storage compartment when its oxygen candle is ignited and released with higher pressure into the battery core. In which case, the inlet valves, such as valves similar to the valve 71 of FIG. 9, of all other compartment sections are closed to prevent the generated oxygen gas from entering those sections and causing the pressure of the oxygen gas entering the battery core to drop.

Figure 10:
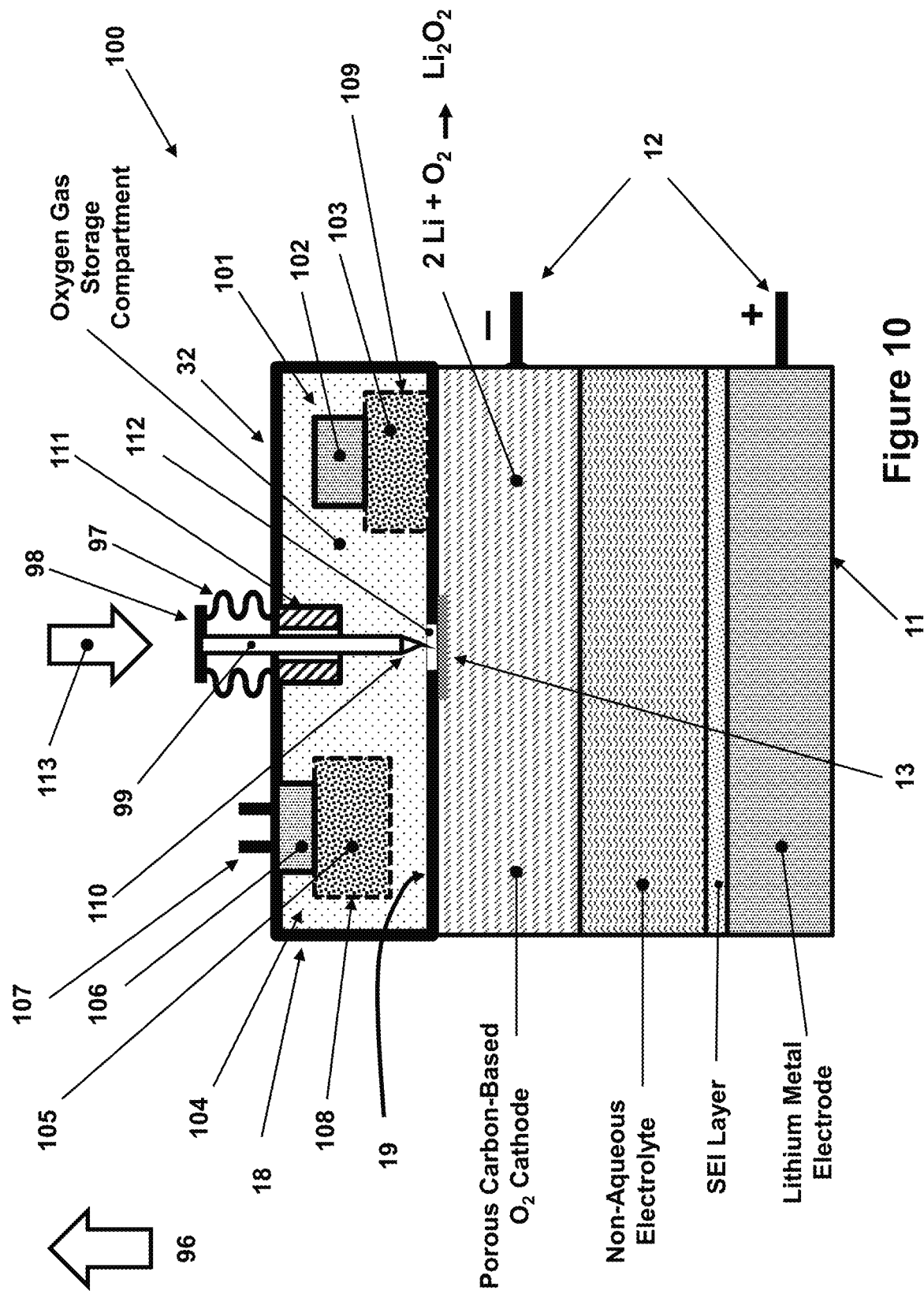
FIG. 10 illustrates the cross-sectional view of another embodiment of the Lithium-Oxygen reserve battery with integrated oxygen generator.

In another Lithium-Oxygen reserve battery with integrated oxygen generator embodiment 100 is shown in the cross-sectional view of FIG. 10. To illustrate the embodiment 100 of Lithium-oxygen reserve batteries of FIG. 10, the prior art Lithium-oxygen reserve battery of FIG. 3A is used as the basis and is provided with the required changes and functional modifications. In the schematic of FIG. 10, all components of the battery are similar to those of the embodiment of FIG. 3A except that no pressurized gas is provided in the oxygen gas storage compartment, FIG. 10, and no valve 71 and bellow 72 and its solenoid actuation mechanism are provided. The Lithium-Oxygen reserve battery with integrated oxygen generator embodiment 100 is, however, provided with at least one oxygen generating unit 101, 104. In the embodiment 90, the container 95 is initially in vacuum or filled with as low a pressure as possible inert gas such as argon and is used to store oxygen gas that is generated by the at least one oxygen generator unit 101, which is inertially activated, and/or with at least one electrically activated oxygen generator unit 104.

When provided, the at least one oxygen generating unit 104 comprises an oxygen candle 105, which in the schematic of FIG. 10 is provided with an electrical pyrotechnic based initiation device 106. The electrical initiator 106 is initiated on demand by electrical energy supplied via the terminals 107, which can be used to heat a bridge wire to ignite the initiator pyrotechnic material. The ignited pyrotechnic material of the initiator 106 would activate the oxygen candle to begin to generate oxygen as described later in this disclosure. The housing 108 of the oxygen candle 105 is provided with opening(s) to allow the generated oxygen to escape into the oxygen gas storage compartment. The electrical initiator 106 is initiated by external powering on demand. The electrical initiators following battery activation may be initiated from the battery power as was described for the electrical initiator 46 of the oxygen generator unit 44 of the embodiment 45 of FIG. 6.

When provided, the at least one inertial igniter initiated oxygen generating unit 101 would similarly comprise an oxygen candle 103 inside a housing 109 that allows the generated oxygen to exit into the oxygen gas storage compartment. The inertial igniter is initiated as was described for the embodiment 45 and 90 of FIGS. 6 and 9 when the device to which the Lithium-Oxygen reserve battery with integrated oxygen generator embodiment 100 is attached is accelerated with a prescribed profile, such as firing of a munition.

The Li-Oxygen reserve battery with integrated oxygen generator units(s) type of embodiment 100 of FIG. 10 is configured and operated as follows. The oxygen gas storage compartment is in vacuum or close to vacuum state (essentially only with oxygen gas) as the inside of the battery core. The membrane 13 is intact and since there is no oxygen available to the battery core, the Li-Oxygen reserve battery 100 is therefore in its inactive state and provides a long shelf life that can significantly exceed the military required 20 years.

Then in pre-activation conditions, as was described for the embodiment of FIG. 3, the membrane 13 is intact and since there is no oxygen available to the battery core, the Li-Oxygen reserve battery 100 is therefore in its inactive state.

Now if the device to which the reserve battery 100 is attached is accelerated in the direction of the arrow 96 (or any prescribed direction, such as the direction of a munition firing), the acceleration would act on the inertial igniter 102, which is configured to react as described below to acceleration in the said prescribed direction. Now if the magnitude of the acceleration in the prescribed direction and its duration are at or above the prescribed levels for battery activation, then the inertial igniter would initiate the oxygen candle 103 as is described later in this disclosure. As a result, the oxygen gas storage compartment is filled with pressurized oxygen gas. Li-Oxygen reserve battery with integrated oxygen generator embodiment 100 of FIG. 10 is thereby ready to be activated at any time.

The Li-Oxygen reserve battery with integrated oxygen generator of the type shown in the cross-sectional view of FIG. 10 has several advantages over the prior art type metal-oxygen reserve batteries, such as the ones shown in FIGS. 3 and 3A, including the following:

1—The reserve batteries are not stored (sometimes up to 20 years) with pressurized oxygen gas, which may leak out and may pose safety issues.

2—At least one of the provided oxygen generating units of the reserve battery may be initiated to fill the oxygen gas storage compartment of the reserve battery during one event (for example during munitions firing by the provided inertial igniter or electrical or other types of initiators). The reserve battery can then be activated at any time on demand, using any one of the methods and devices described later in this disclosure.

3—The use of solid oxygen candle chemicals for producing oxygen gas allows the generation of a significantly larger amount of oxygen gas than can be stored in the same amount of volume. As a result, for the required amount of oxygen gas for a metal-oxygen reserve battery, the oxygen candle-based oxygen gas generators would occupy a smaller volume than a similar capacity pressurized oxygen gas container.

The Li-Oxygen reserve battery with integrated oxygen generator embodiment 100 of FIG. 10 is configured to allow for battery activation manually or using an external positioned actuation device.

As can be seen in FIG. 10, the Lithium-Oxygen reserve battery with integrated oxygen generator embodiment 100 is provided with an activation mechanism that comprises a metallic bellow 97, such as being formed from the same metal with which the container 18 is constructed, such as stainless steel. The bellow 97 is fixedly attached to the top surface of the oxygen gas container 18, such as by welding of brazing, and the attachment is tested to ensure that is fully sealed. The bellow is configured to have the required flexibility so that when pressed to activate the battery as described below, it would essentially act as a spring element and return to its normal state. The bellow is provided with a sealed cap 98, which may be integral to the bellow 97. A pin 99 is fixedly attached to the cap 98 of the bellow 97, which can be provided with a guide 111 inside the oxygen gas storage compartment as can be seen in FIG. 10. The pin 99 is provided with a sharp tip 110, which is over the hole 112 and close to the membrane 13.

Lithium-Oxygen reserve battery with integrated oxygen generator embodiment 100 of FIG. 10 operates as follows. In normal conditions, none of the oxygen candles have been activated and the oxygen gas storage compartment is empty or filled with a negligible amount of an inert gas such as Argon. Then following activation of at least one of the oxygen candles with an inertial or electrical igniters or other possible means as was previously described, pressurized oxygen gas becomes available in the oxygen gas storage compartment, FIG. 10. It is appreciated that since the diaphragm 13 is intact, it prevents the oxygen gas from entering the porous carbon-based $O_2$ cathode of the battery core from the oxygen gas storage compartment. The reserve battery can then stay in its un-activated state almost indefinitely when the oxygen gas storage compartment is hermetically sealed as it is the common practice in reserve batteries used in munitions and other applications in which they are required to have a very long storage (shelf) life of sometimes over 20 years.

In the case of the Lithium-Oxygen reserve battery with integrated oxygen generator embodiment 100 of FIG. 10, the user may then manually press the cap 98 of the bellow 97 down in the direction of the arrow 113. As a result, the bellow 97 begins to deform, allowing the pin 99 to slide down the guide 111, causing the sharp tip 110 of the pin 99 to rupture the diaphragm 13, thereby allowing the oxygen gas to begin to flow into the porous carbon-based $O_2$ cathode section of the battery core and activate the reserve battery.

It is appreciated by those skilled in the art that the cap 98 of the bellow 97 may also be displaced down by an externally positioned linear or rotary electrical, piezoelectric-based or pneumatic or the like actuation device on command, for example provided by a system control system, such as the solenoid linear actuation mechanism of the embodiment of FIG. 9, as is well known in the art.

The reserve battery with integrated oxygen generator embodiment 100 of FIG. 10 may then be provided with the proper electronic and drive components and a capacitor (as shown collectively as the member 86 in FIG. 9—not shown in FIG. 10), for sensing the reserve battery power level and keep the battery operational as needed by supplying the battery core with oxygen by initiating the remaining electrically initiated oxygen candle units, such as the oxygen candle unit 104 shown in the schematic of FIG. 10.

It is appreciated that to initiate an oxygen candle, an initiation device such as a percussion primer or an electrical initiation device such as a so-called electric match may be used. Such mechanical inertial and other percussion primer or other directly applied pyrotechnic based igniters are well known in the art and were referenced previously. Electrical initiators are also well known in the art and are commonly used in thermal reserve and liquid reserve batteries and for initiating various initiation trains in munitions.

As was previously indicated, the release of oxygen from either chlorates or perchlorates requires raising the material to substantial temperatures. The reactions are exothermic, but an additional energy source is generally required to form a sustained reaction. Increasing the reaction temperature increases the rate of oxygen production. The temperatures of the reaction zone may lie within 500-600° C. and they are a function of the actual candle composition, but oxygen candles operating at lower temperatures have also been developed.

In general, the temperature of the oxygen gas entering the battery core needs to be limited to prevent damage to the liquid electrolyte. Also, it is required to keep the temperature of the lithium anode below its melting temperature (180° C.) so that it stays as a solid metal. For this reason, depending on the size of the battery and the candle units, such as the candle units 105 and 109 in the embodiment 100 of FIG. 10, it may desirable to configure the candle units such that they "burn" at relatively slow rates. It is also desirable to ensure that the generated hot oxygen gas is cooled down before entering the battery core.

It is, however, important for the Li-oxygen reserve batteries to operate at peak performance even at very low environmental temperatures. For this reason, when relatively large oxygen candles are use, it is important to control the temperature of the oxygen gas that enters into the battery core by providing temperature control valves such as bi-metal or shape memory based valves described for the embodiment of FIG. 8. Such valves would have the advantage of allowing warm oxygen gas into the battery core at low environmental temperatures while ensuring that the entering oxygen gas is below a certain prescribed battery safe temperature.

Figure 11:
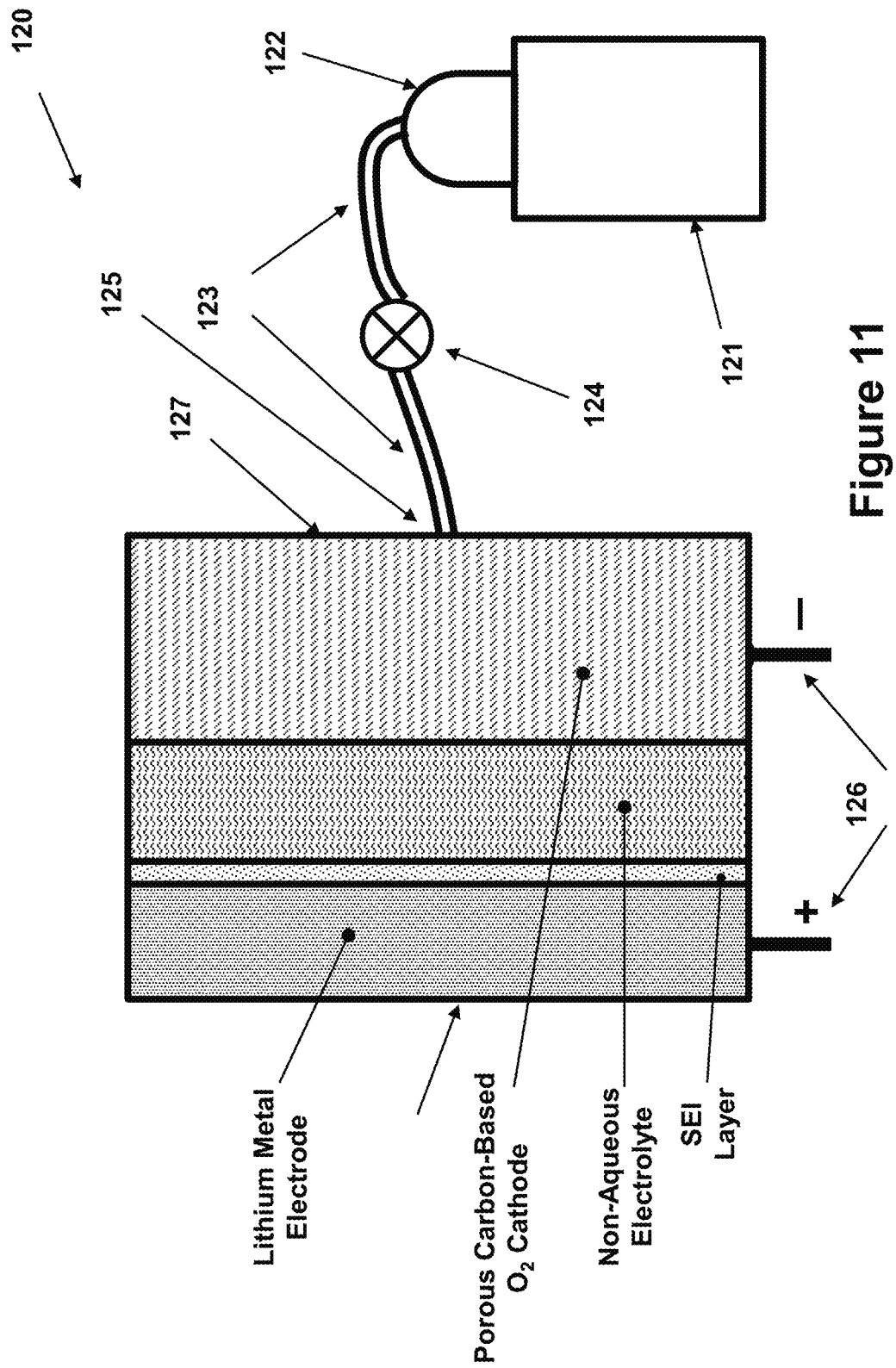
FIG. 11 illustrates the cross-sectional view of another embodiment of the Lithium-Oxygen reserve battery with externally positioned oxygen gas tank and internally or externally positioned activation valves.

Another Lithium-Oxygen reserve battery embodiment 120 is shown in the cross-sectional view of FIG. 11. The battery core of this reserve battery, i.e., its Lithium metal electrode, SEI layer, non-aqueous electrolyte and porous carbon-based $O_2$ cathode are similar to those of the embodiment 100 of FIG. 10, except for the oxygen gas flow channels section shown in FIG. 11.

In the Lithium-Oxygen reserve battery embodiment 120, oxygen gas is stored in a separate pressurized container 121. The oxygen gas container may be provided with a commonly used pressure regular and a manually operated open-close valve 122. An intermediate control valve 124 is also provided either along the path of the tubing 123 as shown in FIG. 11 or as mounted on the surface 127 of the battery core.

The Li-Oxygen reserve battery embodiment 120 is configured to operate in several following modes:
1—In the first mode, the reserve battery does require the control valve 124 to operate but may still be provided with this valve. In normal not-activated conditions, the valve in the pressure regulator and valve unit 122 (hereinafter referred to as only valve) of the oxygen capsule 121 is closed and no oxygen gas can flow into the oxygen gas flow channels and thereby into the battery core porous carbon-based $O_2$ cathode section and the battery. The battery can then be activated by the opening of the valve 122 and allowing the oxygen gas to begin to flow into the battery core. Electrical current can then be provided to the device to be powered via the battery terminals 126. The electrical energy is provided by the battery 120 until the oxygen gas supply is exhausted or the valve 122 is closed and the oxygen remaining inside the battery core is exhausted. The valve 122 may be opened manually or using a commonly used electrically powered or pneumatic actuation device, which may be remotely controlled.

2—The valve of the regulator and valve unit 122 is open (or not even provided) and the flow of oxygen gas into the battery oxygen gas flow channel section is controlled by the valve 124. In normal not-activated conditions, the valve control 124 is closed and no oxygen gas can flow into the oxygen gas flow channels and thereby into the battery core porous carbon-based $O_2$ cathode section and the battery. The battery can then be activated by the opening of the control valve 124 and allowing the oxygen gas to begin to flow into the battery core. The various configurations and operation of the control valve 124 are described below.

The Li-oxygen reserve battery embodiment 120 of FIG. 11 is most useful for use in emergency situations in which certain events, such as certain accidental events such as the start of fire, flooding due to rupture of certain water or steam or natural gas or the like, such as in remote locations or in certain hazardous conditions the prevent rapid human intervention. In such applications, the Li-oxygen reserve battery embodiment 120 can be provided and would stay inactive for even years until it is required to be activated to power certain emergency equipment, such as closing or opening a valve or an outlet to intervene and prevent or minimize further damage. It is therefore appreciated that for such applications, it is highly desirable that the control valve 124 of the Li-oxygen reserve battery embodiment 120 be passive and activate upon detection of the intended hazardous event.

It is noted that control valves 124 that are activated by fire (heat) using bi-metals and shape memory alloys are well known in the art and may be used in the Li-oxygen reserve battery embodiment 120 of FIG. 11. Similar control valves that use float actuated levers to actuate (switch) a control valve that are known in the art may also be used to detect flooding. Other types of sensory devices, for example powered by solar cells, may also be used to power solenoid actuated control valves 124.

There are a lot of details and variables that need to be considered in the configuration of an effective oxygen generator unit (hereinafter referred to as Chemical Oxygen Generation (COG) candle). The shape and arrangement of the COG candle and ignition pellet, the type of ignition system, thermal management, oxygen filtration and delivery are all essential parameters. A goal is a COG system configuration that can be quickly ignited, that enable a stable and isothermal combustion with a relatively low combustion temperature, and that have the highest possible chlorate to oxygen conversion yield. At the same time, the configuration must address adequate thermal management to ensure that the outer candle enclosure and the oxygen stream temperatures do not exceed the allowable values.

Although FIG. 11 shows the external oxygen source and FIGS. 5, 6, 9 and 10 illustrate an internal oxygen candle, the configuration of FIG. 11 can use an external oxygen candle in place of the external oxygen source that provides generated oxygen to the tubing 123 with our without the control valve 122 and actuated upon demand by providing power to the oxygen candle, such as a power source via a switch.

Figure 12:
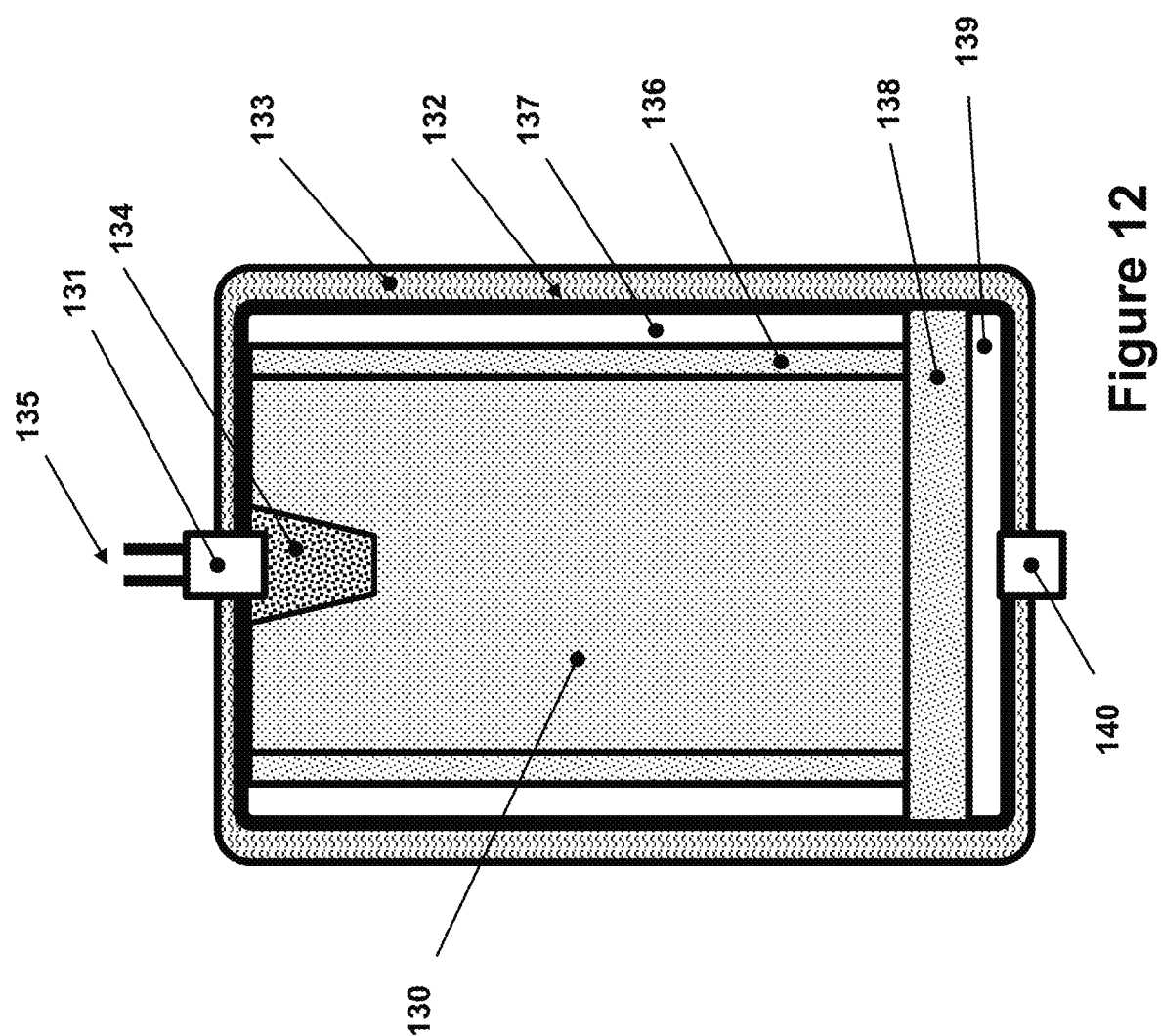
FIG. 12 illustrates the configuration of a Chemical Oxygen Generator (COG) candle unit with an electrical initiator.

FIG. 12 illustrates the cross-sectional view of a configuration of a COG candle unit. In this configuration, the COG candle 130 with its integrated electrical initiator 131 is enclosed inside the metal container 132. The electrical initiator terminals 135 are also shown in the schematic of FIG. 12. The oxygen candle unit of FIG. 12 may be cylindrical in shape or may be constructed in a shape that best fits the reserve battery configuration that it is intended for. The unit is shown to be provided with an exterior thermal insulation layer 133.

The COG candle 130 may be provided with a conically shaped ignition pellet 134 to facilitate the ignition of the candle. Like the COG candle, an ignition pellet may also be composed of an alkali chlorate (~60% wt.), but contains a much larger amount of fuel (e.g. ~20% iron powder) so that it can be easily lighted and burn vigorously, thus ensuring that the COG candle will start to burn properly.

Oxygen gas is produced by thermal decomposition of the chlorates at the burning front of the candle, which moves along the length of the candle as the chlorate and fuel components are consumed. The rate of oxygen evolution is mainly determined by the temperature of the reactants, immediately located ahead of the burning front. Therefore, good heat transfer from the burned to the unburned sections of the candle is required to accomplish a stable oxygen production rate. Long and narrow candles, where the hot oxygen is allowed to flow over the colder unreacted chemicals, may be used for efficient heat transfer.

In the COG configuration shown in FIG. 12, the generated oxygen flows radially, through a first filter 136, into the outer $O_2$ collection channel 137, where it is directed downwards through a second filter 138 at bottom of the candle. The filters remove a fine suspension of alkali metal chloride particles, and any gaseous chemical contaminants that could affect battery performance. The oxygen stream then enters the collection chamber 139 and leaves the COG candle enclosure through the outlet port 140.

Figure 13:
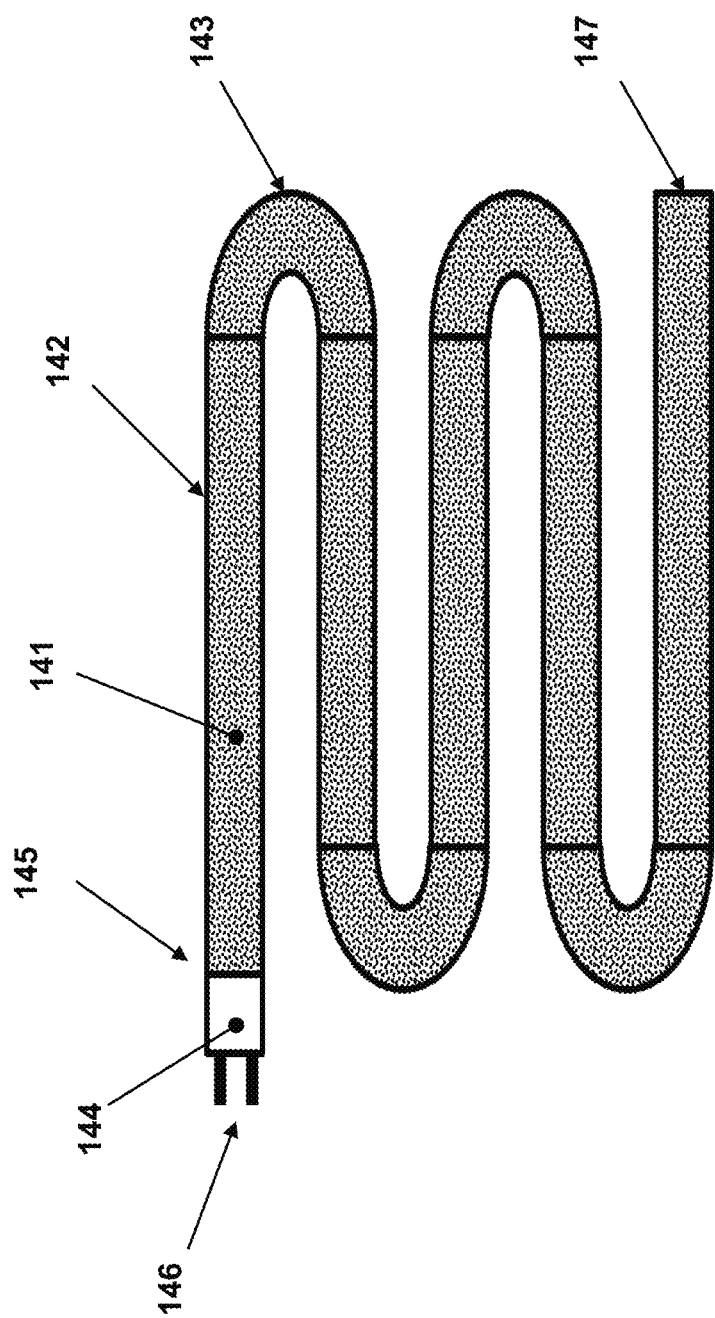
FIG. 13 illustrates another configuration of a Chemical Oxygen Generator (COG) candle unit that is configured for relatively slow burn rate.

FIG. 13 illustrates the cross-sectional view of another COG candle unit configuration. In this configuration, the COG candle material 141 is packed inside a tube of 142, which is provided with outlets on its walls for the generated oxygen to exit. The COG candle material containing tubing 142 may be formed, such as shown in FIG. 13 or in a helical or any other appropriate form to fit the provided space in the oxygen generating unit compartment of the battery, FIGS. 5-6 and 9-10. Similar to the embodiment of FIG. 12, the candle material is shown to be ignited using an electrical initiator 144, which is attached to one end 145 of the COG candle unit housing tubing 142. The other end 147 of the COG candle unit housing tubing 142 is shown to be closed. The terminals 146 of the electrical initiator 144 are also shown in the schematic of FIG. 13. The COG candle unit housing tubing 142 would also be provided with the filtering units 136 and 138 shown in the COG candle unit embodiment of FIG. 12 and may also be fully or partially covered by an exterior thermal insulation layer (not shown).

Once the COG candle unit embodiment of FIG. 13 (for example as the unit 44 in the embodiment 45 and located in the compartment 36 as shown in FIG. 6) is initiated, the generated oxygen gas can then be provided to the battery core through the provided openings (51 in FIG. 6) as was described for the above Li-Oxygen reserve battery embodiments. The primary advantage of the COG candle unit configuration of the type shown in FIG. 13 is that due to the relatively small cross-sectional area of the burning front, the burn rate of the candle material can be configured to be slow, thereby allowing time for the generated oxygen gas to drop before entering the battery core.

It is appreciated that the COG candle tubing housing may have any cross-sectional shape and have varying cross-sectional areas along the length of the tubing to vary the burn rate over time. In fact, the "tubing" may in fact be a helical of other shaped open channel(s) that are provided over the surface of the oxygen gas compartment (for example, the compartment 36 of the embodiment 45 of FIG. 6) and covered with the filtering elements shown in the COG candle unit embodiment of FIG. 12.

Oxygen gas is produced by thermal decomposition of the chlorates at the burning front of the candle, which moves along the length of the candle as the chlorate and fuel components are consumed. The rate of oxygen evolution is mainly determined by the temperature of the reactants, immediately located ahead of the burning front. Therefore, good heat transfer from the burned to the unburned sections of the candle is required to accomplish a stable oxygen production rate. Long and narrow candles, where the hot oxygen is allowed to flow over the colder unreacted chemicals, may be used for efficient heat transfer.

In the COG configuration shown in FIG. 12, the generated oxygen flows radially, through a first filter 136, into the outer $O_2$ collection channel 137, where it is directed downwards through a second filter 138 at bottom of the candle. The filters remove a fine suspension of alkali metal chloride particles, and any gaseous chemical contaminants that could affect battery performance. The oxygen stream then enters the collection chamber 139 and leaves the COG candle enclosure through the outlet port 140.

In the COG candle units of FIGS. 12 and 13, electrical initiators we shown to be used to initiate (ignite) the candle material. It is, however, appreciated that in munitions applications, inertial igniters are also commonly used to activate reserve batteries and as was previously described for the disclosed Li-oxygen reserve battery embodiments, such inertial igniters may also be used to initiate the COG candles (the first COG candle unit when more than one candle unit is provided) in response to an all-fire acceleration profile as previously described.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A metal-gas battery comprising:
   a battery core comprising:
   a metal anode;
   a non-aqueous electrolyte;
   a porous cathode; and
   terminals for providing electrical power from the battery core;
   a gas generator configured to be activated by electrical power to generate a pressurized gas; and
   a gas container having an opening through which the generated gas can move from the gas container into the porous cathode to activate the battery core.

2. The metal-gas battery of claim 1, wherein the battery core comprises:
   a first housing for hermetically sealing the metal anode, non-aqueous electrolyte and porous cathode therein; and
   a second housing for hermetically sealing the gas container to the first housing.

3. The metal-gas battery of claim 1, wherein the gas generator is an oxygen candle.

4. The metal-gas battery of claim 1, wherein the gas generator is disposed in the gas container.

5. The metal-gas battery of claim 1, wherein the gas generator comprises a plurality of gas generators.

6. The metal-gas battery of claim 1, wherein the gas generator is configured to be powered by an external power source.

7. The metal-gas battery of claim 1, wherein the gas generator is configured to be powered by an inertial igniter configured to supply electrical power to the gas generator upon experiencing an acceleration having a predetermined magnitude and duration.

8. The metal-gas battery of claim 5, wherein:
   the gas generator comprises first and second gas generators,
   the first gas generator being configured to be powered by an inertial igniter configured to supply electrical power to the first gas generator upon experiencing an acceleration having a predetermined magnitude and duration, and
   the second gas generator being configured to be powered by an output from the first gas generator.

9. The metal-gas battery of claim 1, further comprising:
   a flap sealingly closing the opening;
   wherein the flap being configured to change shape from a first position sealingly closing the opening to prevent the pressurized gas from moving from the gas container into the porous cathode to a second position allowing the pressurized gas to move through the opening from the gas container into the porous cathode upon an increase in temperature in the gas container; and
   the flap is biased in the second position.

10. The metal-gas battery of claim 1, further comprising:
    a diaphragm sealingly closing the opening; and
    a member movable between a first position and a second position, the member being configured to rupture the diaphragm when moved to the second position;
    wherein the member is biased in the first position.

11. The metal-gas battery of claim 10, wherein the member is configured to move to the second position by an applied force to the member.

12. The metal-gas battery of claim 11, wherein:
    the member includes an extending portion; and
    a bellows sealingly covers the extended portion, the bellows at least partially biasing the member in the first position.

13. The metal-gas battery of claim 1, further comprising:
    a seal covering the opening and being movable between a sealed position preventing the pressurized gas from moving from the gas container into the porous cathode to an unsealed position allowing the pressurized gas to move through the opening from the gas container into the porous cathode;
    a member movable between a first position and a second position, the member being configured to move the seal into the unsealed position when the member moves to the second position;
    wherein the member moves to the second position upon experiencing an acceleration having a predetermined magnitude and duration.

14. The metal-gas battery of claim 13, wherein the seal is biased in the sealed position and the member is biased in the first position.

15. The metal-gas battery of claim 1, further comprising an energy storage device configured to receive at least a partial amount of energy generated by the battery core after the gas generator is activated.

16. The metal-gas battery of claim 1, wherein the gas generator comprises first and second gas generators, the first gas generator being configured to activate the battery core and the energy storage device at least partially providing the received energy to operate the second gas generator.

17. The metal-gas battery of claim 16, wherein the energy storage device is under the control of a controller.

18. The metal-gas battery of claim 1, wherein the metal anode is lithium.

19. The metal-gas battery of claim 1, wherein the pressurized gas is oxygen or a gas containing oxygen.

20. The metal-gas battery of claim 19, wherein the porous cathode is a porous carbon-based cathode.

* * * * *